United States Patent [19]
Yasuda et al.

[11] Patent Number: 5,621,481
[45] Date of Patent: Apr. 15, 1997

[54] MOTION VECTOR DETECTING APPARATUS FOR DETERMINING INTERFRAME, PREDICTIVE ERROR AS A FUNCTION OF INTERFIELD PREDICTIVE ERRORS

[75] Inventors: Kazunori Yasuda; Jun Yonemitsu, both of Kanagawa, Japan

[73] Assignee: Sony Corporation, Tokyo, Japan

[21] Appl. No.: 343,518

[22] PCT Filed: Apr. 8, 1994

[86] PCT No.: PCT/JP94/00594

§ 371 Date: Mar. 8, 1995

§ 102(e) Date: Mar. 8, 1995

[87] PCT Pub. No.: WO94/24821

PCT Pub. Date: Oct. 27, 1994

[30] Foreign Application Priority Data

Apr. 8, 1993 [JP] Japan .................... 5-082105

[51] Int. Cl.$^6$ .................................................. H04N 7/32
[52] U.S. Cl. ................................. 348/699; 348/416
[58] Field of Search .................................. 348/699, 416, 348/402, 415, 409, 401, 400, 390, 384

[56] References Cited

U.S. PATENT DOCUMENTS

| | | | |
|---|---|---|---|
| 5,068,722 | 11/1991 | Sugiyama | 348/420 |
| 5,093,720 | 3/1992 | Krause et al. | 348/416 |
| 5,175,618 | 12/1992 | Ueda et al. | 348/699 |
| 5,193,004 | 3/1993 | Wang et al. | 348/413 |
| 5,317,397 | 5/1994 | Odaka et al. | 348/416 |
| 5,412,435 | 5/1995 | Nakajima | 348/699 |

FOREIGN PATENT DOCUMENTS

| | | |
|---|---|---|
| 0484140A2 | 5/1992 | European Pat. Off. . |
| 0598904A | 6/1994 | European Pat. Off. . |
| WO93/03578A | 2/1993 | WIPO . |

OTHER PUBLICATIONS

Yasuda, Hiroshi, "International Standard for Multi-Media Coding", *Maruzen*, Jul. 30, 1991, p. 110.

IEEE Transactions on Circuits and Systems, vol. 36, No. 10, Oct. 1, 1989 pp. 1317–1325, XP000085319 Kun–Min Yang et al "A Family of VLSI Designs for the Motion Compensation Block–Matching Algorithm".

*Primary Examiner*—Tommy P. Chin
*Assistant Examiner*—Bryan S. Tung
*Attorney, Agent, or Firm*—William S. Frommer; Alvin Sinderbrand

[57] ABSTRACT

A motion vector detecting apparatus adapted for detecting motion vectors in motion prediction of an interlaced moving picture comprised of sets of picture blocks consisting of a plurality of pixels. In the case of carrying out five motion predictive error calculations of motion vector from current frame to frame to which reference is made, motion vector from odd field of current frame to odd field of frame to which reference is made, motion vector from odd field of current frame to even field of frame to which reference is made, motion vector from even field of current frame to odd field of frame to which reference is made, and motion vector from even field of current frame to even field of frame to which reference is made, output results of accumulators for carrying out calculation of motion vectors for field are used as they are, thus to carry out calculation of motion vectors for frame at the same time.

8 Claims, 16 Drawing Sheets

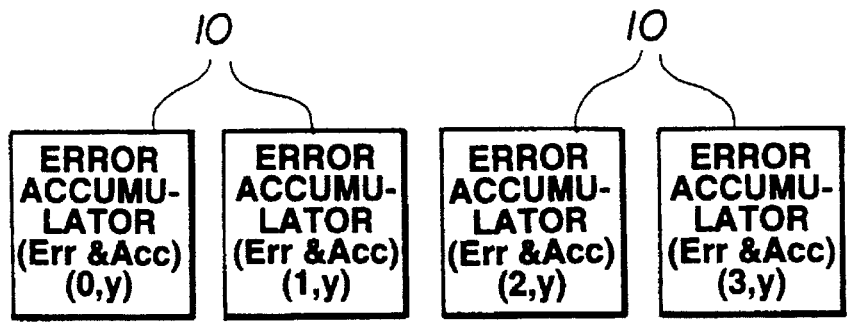
FIG.13a
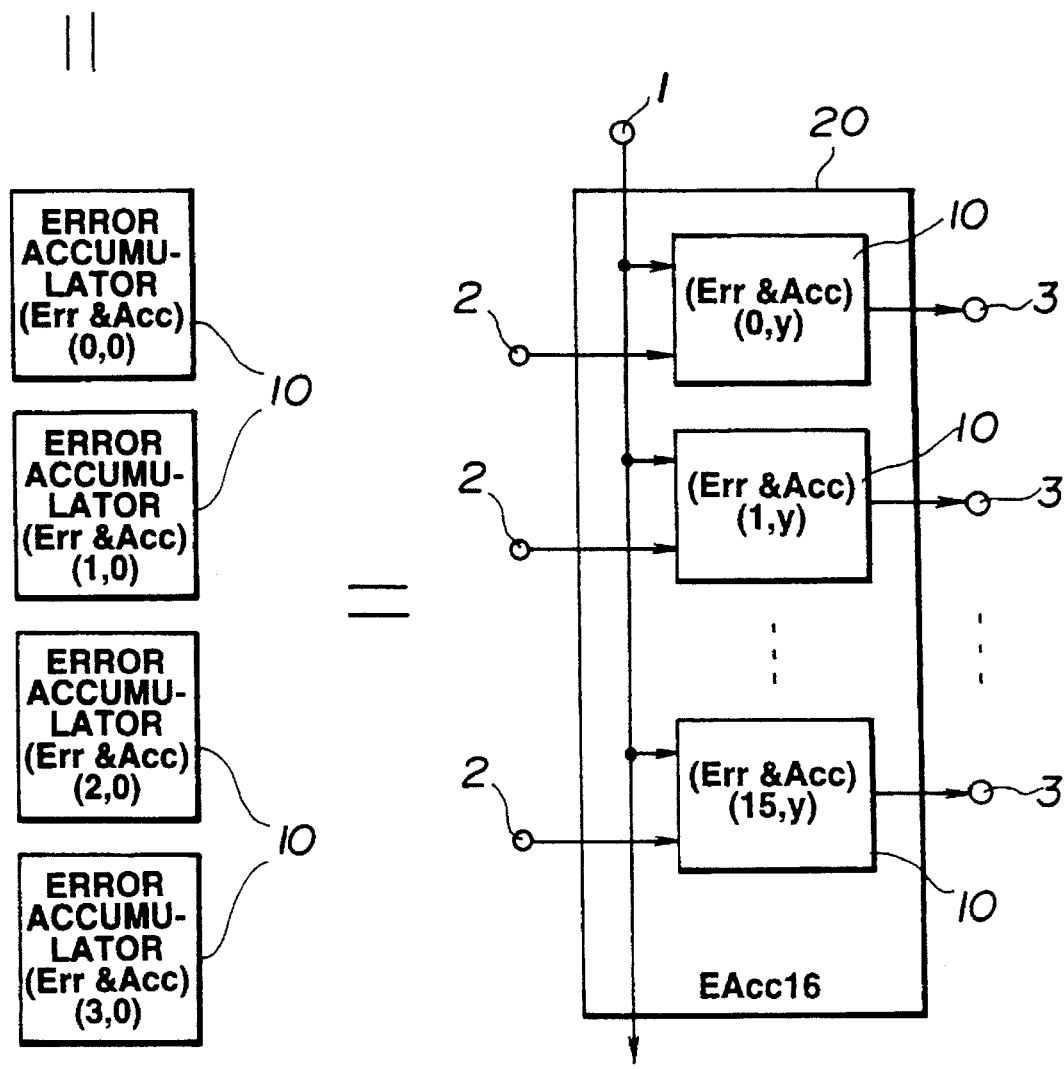
FIG.13b     FIG.13c

MOTION VECTOR DETECTING APPARATUS FOR DETERMINING INTERFRAME, PREDICTIVE ERROR AS A FUNCTION OF INTERFIELD PREDICTIVE ERRORS

TECHNICAL FIELD

This invention relates to a motion vector detecting apparatus adapted for detecting motion vectors in motion prediction of an interlaced moving picture comprised of sets of picture blocks consisting of a plurality of pixels.

BACKGROUND ART

Hitherto, in carrying out motion prediction of an interlaced moving picture comprised of sets of groups of pixels (generally called picture blocks or macro blocks) consisting of a plurality of pixel data, in the case where, e.g., moving pictures of two frames of a frame picture serving as a current picture (current frame picture) A and a frame picture serving as a reference picture (reference frame picture) B are used to calculate motion vector $MV_{AB}$ from the current frame picture A to the reference frame picture B, there is a method of accumulating or cumulatively calculating, by the number of pixels within corresponding picture block, absolute values (or square values, etc.) of differences between respective correspondence pictures of picture blocks of the both frame pictures to obtain predictive error value E (x, y) to select an optimum (ordinarily, minimum error) candidate vector from a plurality of candidate vectors mv(x,y) corresponding to respective picture blocks within a search range given in advance to employ it as the motion vector $MV_{AB}$.

Namely, in the case of determining motion vectors of an interlaced picture by using such a motion vector detecting system, there is adopted a system in which data of both pictures of current frame picture A and reference frame picture B are merely inputted to a circuit for calculating motion vectors to obtain, at this circuit, error quantity outputs corresponding to respective candidate vectors of candidate vector groups (candidate vector groups corresponding to respective picture blocks within the search area) which are considered as candidate to employ a candidate vector corresponding to the error quantity output which is minimum among them as motion vector $MV_{AB}$ of that picture (picture block).

Meanwhile, in the so-called MPEG2, adaptive switching between motion compensated prediction of the frame base and motion compensated prediction of the field base is allowed. In the case of carrying out such adaptive switching, in macro block of P picture, for example, the following five motion predictive error calculations are required.

Namely, when it is assumed that odd field of current frame picture A is current odd field ao, even field thereof is current even field ae, odd field of reference frame picture B to be searched is reference odd field bo, and even field thereof is reference even field be, five motion predictive error calculations of calculation of motion vector $MV_{AB}$ from current frame picture A to reference frame picture B, calculation of motion vector $MV_{aobo}$ from current odd field ao to reference odd field bo, calculation of motion vector $MV_{aobe}$ from current odd field ao to reference even field be, calculation of motion vector $MV_{aebo}$ from current even field ae to reference odd field bo, and calculation $MV_{aebe}$ from current even field ae to reference even field be are required.

It is general to carry out, in parallel, these five motion predictive error calculations by using five hardware of similar structure for respectively carrying out corresponding calculations. Accordingly, large-scale of equipment constitutes problem.

DISCLOSURE OF THE INVENTION

This invention has been made in view of actual circumstances as described above, and its object is to provide a motion vector detecting apparatus which permits the configuration to be of small scale.

In order to attain the above-described object, this invention has been proposed, and is directed to a motion vector detecting apparatus comprising: a plurality of first accumulating means for determining (calculating) accumulated values (cumulatively calculated value) of differences between respective pixels of odd lines of picture blocks of a current picture and respective pixels of odd lines of picture blocks of a reference picture of an interlaced moving picture comprised of sets of picture blocks (macro blocks) consisting of a plurality of pixels; a plurality of second accumulating means for determining accumulated values of differences between respective pixels of even lines of picture blocks of the current picture and respective pixels of even lines of picture blocks of the reference picture; a plurality of third accumulating means for determining accumulated values of differences between respective pixels of odd lines of picture blocks of the current picture and respective pixels of even lines of picture blocks of the reference picture; a plurality of fourth accumulating means for determining accumulated values of differences between respective pixels of even lines of picture blocks of the current picture and respective pixels of odd lines of picture blocks of the reference picture; a plurality of first adding means for adding accumulated results of the first and second accumulating means; a plurality of second adding means for adding accumulated results of the third and fourth accumulating means; a plurality of first evaluation function calculating means for determining (calculating) first evaluation function values (absolute values or square values) from added results of the first adding means; a plurality of second evaluation function calculating means for determining second evaluation function values (absolute values or square values) from added results of the second adding means; and selector means for taking out, as a motion vector, a candidate vector (candidate vector corresponding to an added result which is judged to be minimum of added results of the first and second adding means) selected on the basis of evaluation function values of the plurality of first and second evaluation function calculating means from a plurality of candidate vectors.

Moreover, a motion vector detecting apparatus of this invention comprises: a plurality of first accumulating means for determining (calculating) accumulated values of differences between respective pixels of odd lines of picture blocks of a current picture and respective pixels of odd lines of picture blocks of a reference picture of an interlaced moving picture comprised of sets of picture blocks consisting of a plurality of pixels; a plurality of second accumulating means for determining accumulated values of differences between respective pixels of even lines of picture blocks of the current picture and respective pixels of even lines of picture blocks of the reference picture; a plurality of third accumulating means for determining accumulated values of differences between respective pixels of odd lines of picture blocks of the current picture and respective pixels of even lines of picture blocks of the reference picture; a plurality of fourth accumulating means for determining accumulated values between respective pixels of even lines of picture blocks of the current picture and respective pixels of odd lines of picture blocks of the reference picture; a plurality of first adding means for adding accumulated results of the first and second accumulating means; a plurality of second adding means for adding accumulated results of the third and fourth accumulating means; a plurality of first evaluation function calculating means for determining (calculating) first evaluation function values (absolute values or square values) from added results of the first adding means; a plurality of second evaluation function calculating means for determining second evaluation function values (absolute values or square values) from added results of the second adding means; a plurality of third evaluation function calculating means for determining third evaluation function values (absolute values or square values) from accumulated results of the first accumulating means; a plurality of fourth evaluation function calculating means for determining fourth evaluation function values (absolute values or square values) from accumulated results of the second accumulating means; a plurality of fifth evaluation function calculating means for determining fifth evaluation function values (absolute values or square values) from accumulated results of the third accumulating means; a plurality of sixth evaluation function calculating means for determining sixth evaluation function values (absolute values or square values) from accumulated results of the fourth accumulating means; first selector means for taking out, as a motion vector, a candidate vector (candidate vector corresponding to an added result which is judged to be minimum of added results of the first and second adding means) selected on the basis of evaluation function values of the plurality of first and second evaluation function calculating means from a plurality of candidate vectors; second selector means for selecting, as a motion vector, a candidate vector (candidate vector corresponding to an accumulated result which is judged to be minimum of accumulated results of the first accumulating means) selected on the basis of evaluation function values of the plurality of third evaluation function calculating means from a plurality of candidate vectors; third selector means for selecting, as a motion vector, a candidate vector (candidate vector corresponding to an accumulated result which is judged to be minimum of accumulated results of the second accumulating means) selected on the basis of evaluation functions of the plurality of fourth evaluation function calculating means from a plurality of candidate vectors; fourth selector means for selecting, as a motion vector, a candidate vector (candidate vector corresponding to an accumulated result which is judged to be minimum of accumulated results of the third accumulating means) selected on the basis of evaluation function values of the plurality of fifth evaluation function calculating means from a plurality of candidate vectors; and fifth selector means for selecting, as a motion vector, a candidate vector (candidate vector corresponding to an accumulated result which is judged to be minimum of accumulated results of the fourth accumulating means) selected on the basis of evaluation function values of the plurality of six evaluation function calculating means from a plurality of candidate vectors.

Namely, the motion vector detecting apparatus of this invention is a motion vector detecting apparatus applied to motion prediction of interlaced moving picture comprised of sets of groups of pixels (generally called picture blocks) consisting of a plurality of pixel data. In the case where current frame picture (current frame picture A) consists of current odd field ao and current even field ae, and respective fields of a frame to be searched (reference frame picture B) consist of reference odd field bo and reference even field be, in carrying out five motion predictive error calculations of motion vector $MV_{AB}$ from current frame picture A to reference frame picture B, motion vector $MV_{aobo}$ from current odd field ao to reference odd field bo, motion vector $MV_{aobe}$ from current odd field ao to reference even field be, motion vector $MV_{aebo}$ from current even field ae to reference odd field bo, and motion vector $MV_{aebe}$ from current even field ae to reference even field be, output results of accumulators for calculating motion vectors $MV_{aobo}$–$MV_{aebe}$ for field are used as they are without separately having accumulator for calculating motion vector $MV_{AB}$ for frame, thus to carry out calculation of motion vector $MV_{AB}$ for frame at the same time.

In accordance with the motion vector detecting apparatus of this invention, accumulated values of differences in field are added to thereby form accumulated values of differences in frame. Accordingly, separate configuration for forming accumulated values of differences in frame becomes unnecessary.

BRIEF DESCRIPTION OF THE DRAWINGS

FIG. 13 is a view for explaining the principle in constituting error accumulator.

BEST MODE FOR CARRYING OUT INVENTION

Preferred embodiments of this invention will now be described with reference to the attached drawings.

Figure 1:
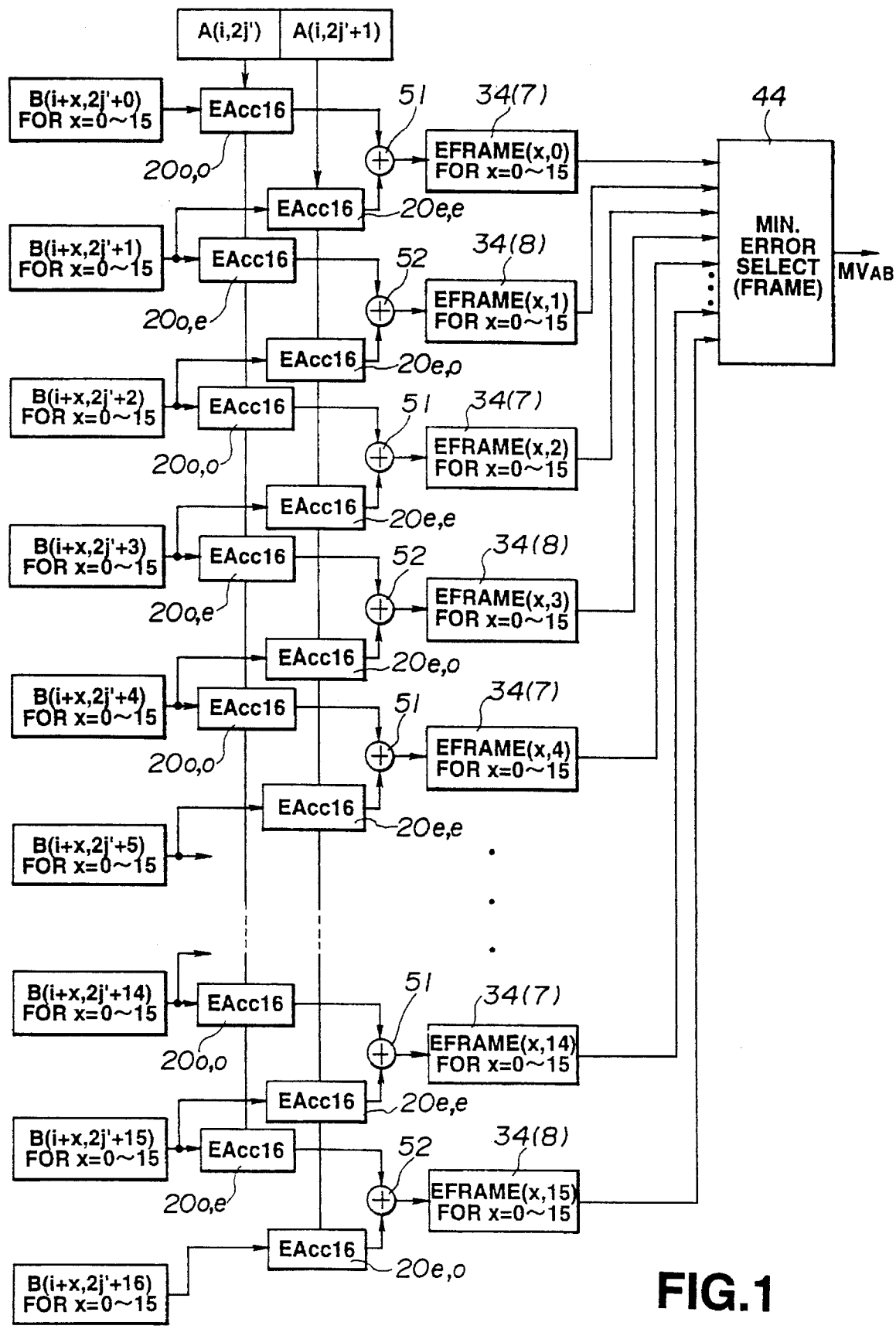
FIG. 1 is a circuit diagram showing, in a block form, outline of the configuration of the essential part of a motion vector detecting apparatus of a first embodiment of this invention.

A motion vector detecting apparatus of a first embodiment of this invention comprises (as shown in FIG. 1, for example) a plurality of first accumulating means (block error accumulating circuits $20_{o,o}$) for determining (calculating) accumulated values of differences between respective pixels of lines of picture blocks of current odd field ao constituting current frame picture A and respective pixels of lines of picture blocks of reference odd field bo constituting reference frame picture B of an interlaced moving picture comprised of sets of picture blocks (macro blocks) consisting of a plurality of pixels; a plurality of second accumulating means (block error accumulating circuits $20_{e,e}$) for similarly determining accumulated values of differences between respective pixels of current even field ae (even lines) and respective pixels of reference even field be (even lines); a plurality of third accumulating means (block error accumulating circuits $20_{o,e}$) for determining accumulated values of differences between respective pixels of current odd field ao and respective pixels of the reference even field be; a plurality of fourth accumulating means (block error accumulating circuits $20_{e,o}$) for determining accumulated values of differences between respective pixels of current even field be and respective pixels of reference odd field bo; a plurality of first adders 51 for adding accumulated results of the first and second accumulating circuits $20_{o,o}$ and $20_{e,e}$; a plurality of second adders 52 for adding accumulated results of the third and fourth block error accumulating circuits $20_{o,e}$ and $20_{e,o}$; a plurality of first evaluation function calculating circuits $34_{(7)}$ for determining (calculating) first evaluation function values (absolute values or square values) from added results of the adders 51; a plurality of second evaluation function calculating circuits $34_{(8)}$ for determining second evaluation function values (absolute values or square values) from added results of the adders 52; and selector means (minimum error selecting circuit 44) for taking out, as motion vector $MV_{AB}$ in frame, candidate vector mv (candidate vector mv corresponding to added results which is judged to be minimum of added results of the first and second adders 51, 52) selected on the basis of evaluation function values of the plurality of first and second evaluation function calculating circuits $34_{(7)}$, $34_{(8)}$ from a plurality of candidate vectors mv.

Figure 2:
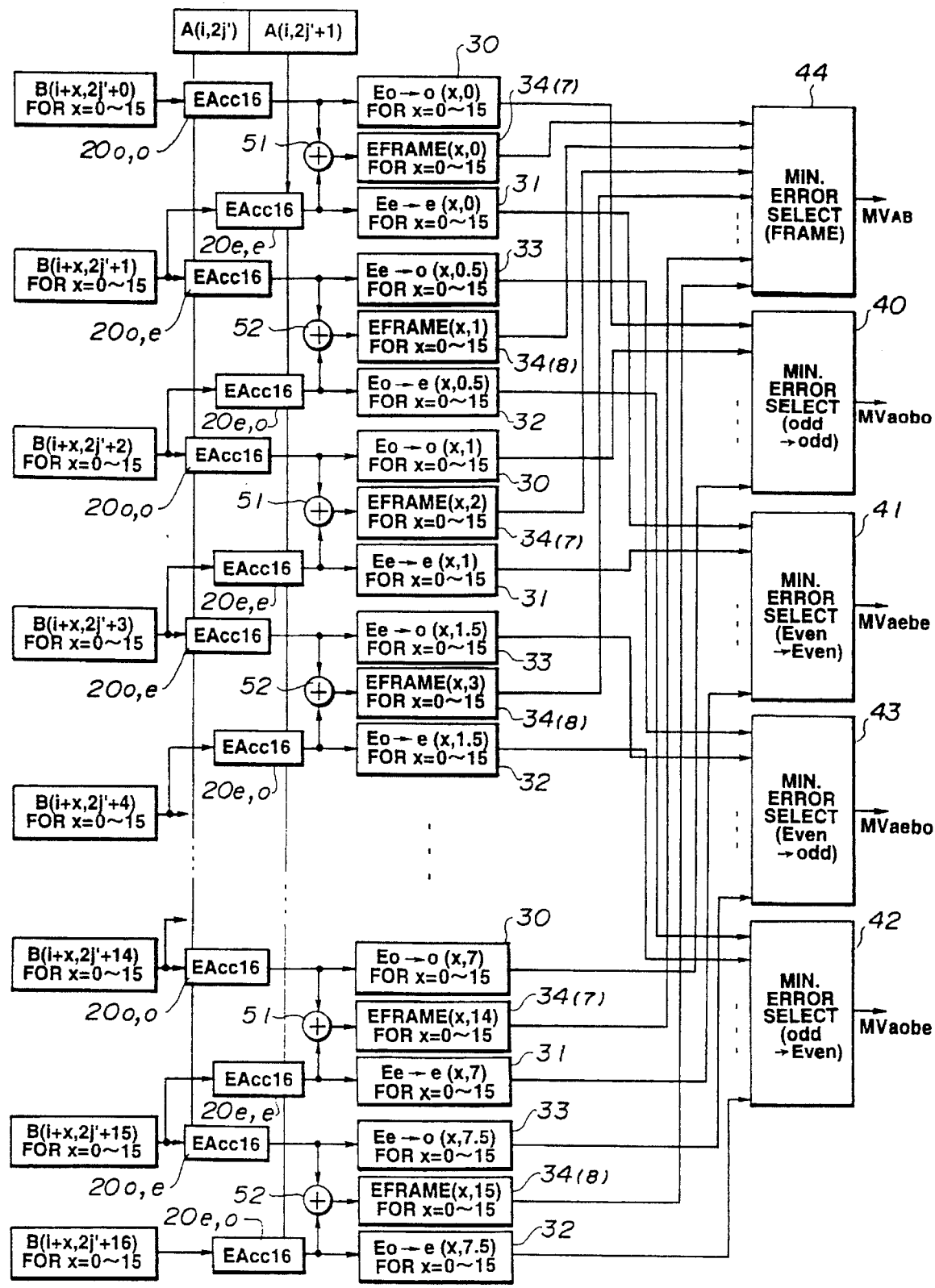
FIG. 2 is a circuit diagram showing, in a block form, outline of the configuration of the essential part of a motion vector detecting apparatus of a second embodiment of this invention.

Moreover, a motion vector detecting apparatus of a second embodiment of this invention comprises (as shown in FIG. 2, for example): similarly to the apparatus of the first embodiment, four block error accumulating circuits $20_o$, $_o$~$20_{e,o}$; first and second adders 51, 52; a plurality of first evaluation function calculating circuits $34_{(7)}$ for determining first evaluation function values (absolute values or square values) from added results of the first adders 51; and a plurality of second evaluation function calculating circuits 60 $34_{(8)}$ for determining second evaluation function values (absolute values or square values) from added results of the second adder 52, and further comprises: a plurality of third evaluation function calculating circuits 30 for determining (calculating) third evaluation function values (absolute values or square values) from accumulated results of the first block error accumulating circuits $20_{o,o}$; a plurality of fourth evaluation function calculating circuits 31 for determining fourth evaluation function values (absolute values or square values) from accumulated results of the second block error accumulating circuits $20_{e,e}$; a plurality of fifth evaluation function calculating circuits 32 for determining fifth evaluation function values (absolute values or square values) from accumulated results of the third block error accumulating circuits $20_{o,e}$; a plurality of sixth evaluation function calculating circuits 33 for determining sixth evaluation function values (absolute values or square values) from accumulated results of the fourth block error accumulating circuits $20_{e,o}$; a first minimum error selecting circuit 44 for taking out, as motion vector $MV_{AB}$ in frame, candidate vector mv (candidate vector mv corresponding to an added result which is judged to be minimum of added results of first and second adders 51, 52) selected on the basis of evaluation function values of the plurality of first and second evaluation function calculating circuit $34_{(7)}$, $34_{(8)}$ from a plurality of candidate vectors mv; a second minimum error selecting circuit 40 for taking out, as motion vector $MV_{aobo}$, candidate vector mv (candidate vector mv corresponding to an accumulated result which is judged to be minimum of accumulated results of the first block error accumulating circuits $20_{o,o}$) selected on the basis of evaluation function values of the plurality of third evaluation function calculating circuits 30 from a plurality of candidate vectors mv; a third minimum error selecting circuit 41 for taking out, as motion vector $MV_{aebe}$, candidate vector mv (candidate vector mv corresponding to an accumulated value which is judged to be minimum of accumulated values of the second block error accumulating circuits $20_{e,e}$); a fourth minimum error selecting circuit 43 for taking out, as motion vector $MV_{aobe}$, candidate vector mv (candidate vector mv corresponding to an accumulated result which is judged to be minimum of accumulated results of the third block error accumulating circuits $20_{o,e}$) selected on the basis of evaluation function values of the plurality of fifth evaluation function calculating circuits 32 from a plurality of candidate vectors mv; and a fifth minimum error selecting circuit 42 for taking out, as motion vector $MV_{aebo}$, candidate vector mv (candidate vector mv corresponding to an accumulated result which is judged to be minimum of accumulated values of the fourth block error accumulating circuits $20_{e,o}$) selected on the basis of evaluation function values of the plurality of sixth evaluation function calculating circuits 34 from a plurality of candidate vectors mv.

Initially, prior to description of the configuration of the motion vector detecting apparatuses of these embodiments shown in FIGS. 1 and 2, a motion vector calculating method of this invention will now be described.

In this invention, there is employed a scheme such that attention is drawn to the fact that current frame picture A is composed of current odd field ao and current even field ae and reference frame picture B is also composed of reference odd field bo and reference even field be to allow an error calculating circuit which is a portion of motion vector calculating circuit to be partially used in common, thereby reducing the circuit scale.

Namely, in the case of carrying out full search by motion compensation, when it is assumed that current frame picture is the above-mentioned current frame picture A, frame picture to be searched is the above-mentioned reference frame picture B, and the ranges of candidate vector are respectively 0–15 in vertical and horizontal directions, evaluation function value E (x, y) corresponding to each candidate vector mv (x, y) is generally given by the following formula (1):

$$E_{frame}(x,y) = \sum_{j=0}^{15}\sum_{i=0}^{15} \{Err[A(i,j) - B(i+x, j+y)]\} \quad (1)$$

In the above formula (1), $E_{frame}$ (x, y) indicates evaluation function value, and Err indicates error function. As general evaluation function value, absolute value or square value, etc. is used.

Moreover, in the above formula, A (i, j) indicates the (i, j)-th pixel value (luminance value of pixel from a practical point of view) in horizontal and vertical directions within one picture block of current frame picture A, and B (i, j) indicates the (i, j)-th pixel value (luminance value of pixel from a practical point of view) in horizontal and vertical directions of positions respectively corresponding to respective pixels of the current frame picture A of reference frame picture B.

By dividing the above-mentioned formula (1) into two parts in correspondence with current odd field ao and current even field ae belonging to current frame picture A including the pixel A (i, j), the following formula (2) can be obtained.

$$E_{frame}(x,y) = \sum_{j'=0}^{7}\sum_{i=0}^{15} \{Err[A(i,2j') - B(i+x,2j'+y)] + \quad (2)$$

$$Err[A(i,2j'+1) - B(i+x,2j'+1+y)]\}$$

In the above formula (2), j'=[j/2] and [j/2] means that integer which is not beyond j/2 is given.

Motion compensation in field will be similarly defined as follows. For example, in the case of motion compensation from current odd field ao to reference odd field bo, evaluation function value is indicated by the following formula (3).

$$E_{o \to o}(x,y') = \sum_{j'=0}^{7}\sum_{i=0}^{15} \{Err[A(i,2j') - B(i+x,2j'+2y)]\} \quad (3)$$

In the case of motion compensation from current even field ae to reference even field be, evaluation function value is indicated by the following formula (4).

$$E_{e \to e}(x,y') = \sum_{j'=0}^{7}\sum_{i=0}^{15} \{Err[A(i,2j'+1) - B(i+x,2j'+2y'+1)]\} \quad (4)$$

In the case of motion compensation from current odd field ao to reference even field be, evaluation function value is indicated by the following formula (5).

$$E_{o \to e}(x, y' + 0.5) = \quad (5)$$

$$\sum_{j'=0}^{7}\sum_{i=0}^{15} \{Err[A(i,2j'+1) - B(i+x,2j'+2(y'+0.5)+1)]\} =$$

$$\sum_{j'=0}^{7}\sum_{i=0}^{15} \{Err[A(i,2j'+1) - B(i+x,2j'+1+(2y'+1))]\}$$

In the case of motion compensation from current even field ae to reference odd field bo, evaluation function value is indicated by the following formula (6).

$$E_{e \to o}(x, y' + 0.5) = \quad (6)$$

$$\sum_{j'=0}^{7}\sum_{i=0}^{15} \{Err[A(i,2j') - B(i+x,2j'+2(y'+0.5))]\} =$$

$$\sum_{j'=0}^{7}\sum_{i=0}^{15} \{Err[A(i,2j') - B(i+x,2j'+(2y'+1))]\}$$

In the above-described case, writing y=2y' when the value of y is even number, evaluation function value in frame is indicated by the following formula (7):

$$E_{frame}(x,y) = E_{o \to o}(x,y') + E_{e \to e}(x,y') \quad (7)$$

Further, it is seen that writing y=2y'+1 when the value of y is odd number, evaluation function value in frame is indicated by the following formula (8).

$$E_{frame}(x,y) = E_{e \to o}(x,y'+0.5) + E_{o \to e}(x,y'+0.5) \quad (8)$$

It is seen that when attention is drawn to the above-mentioned point, if search for motion vector detection in field and search for motion vector detection in frame are combined, hardware can be commonly used. The fundamental feature of this invention is the above-described point. Further, searches are combined in this way, thereby making it possible to calculate (predictive errors of) motion vector with respect to two pixels at the same time. Thus, the effect permitting the clock rate in the circuit to be lowered, or the like can be expected.

The fundamental motion predictive error calculation method which provides basis of this invention will now be described by using the frame mode shown in FIG. 3 (i.e., mode of motion predictive error calculation in frame) and field mode shown in FIGS. 4 to 7 (i.e., mode of motion predictive error calculation in field).

Figure 3:
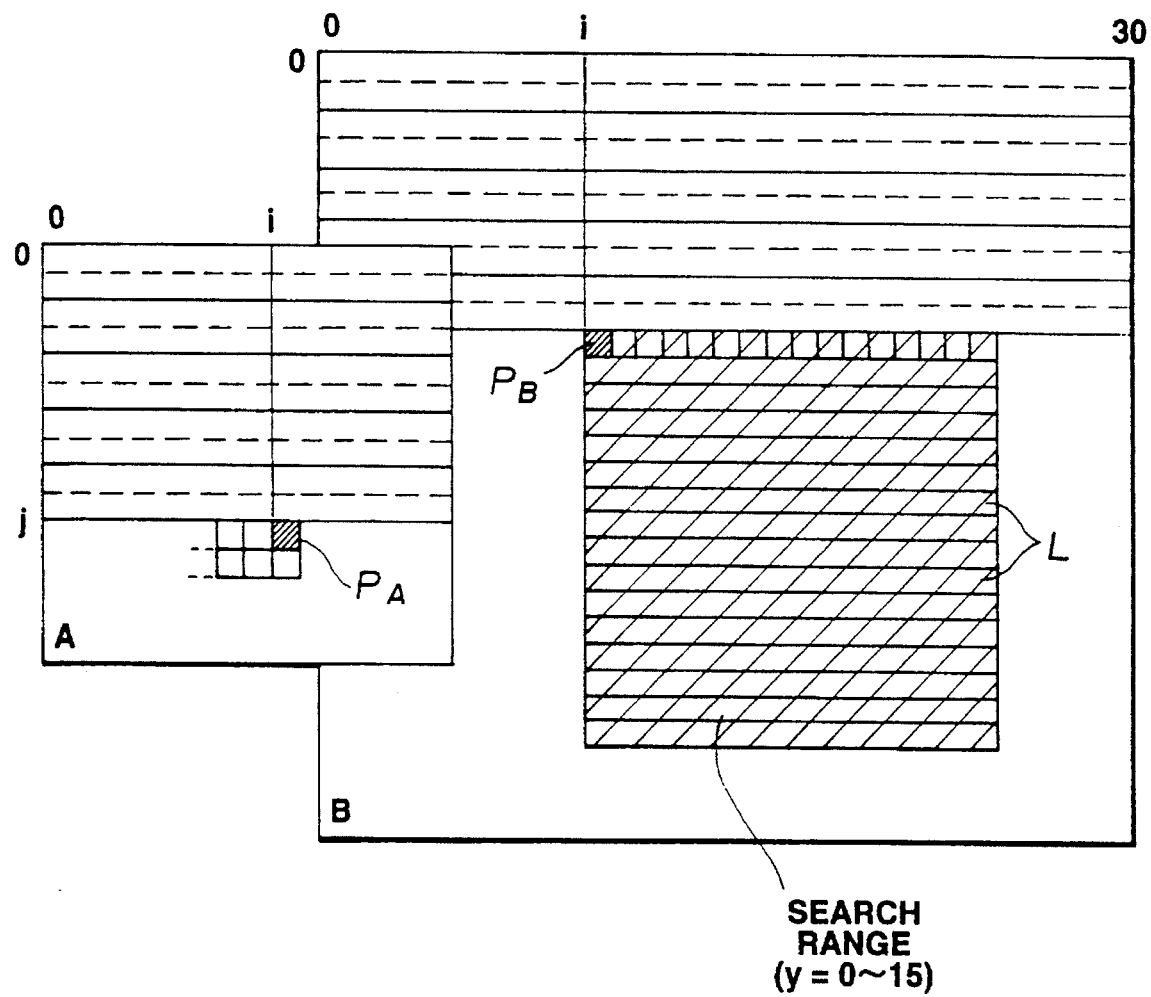
FIG. 3 is a view for explaining accumulation of errors between current frame picture and reference frame picture.

FIG. 3 shows the moment when evaluating differences between the (i, j)-th pixel A (i, j) of current frame picture A and respective pixels in the entire corresponding search range on reference frame picture B in the frame mode (mode of motion predictive error calculation in frame). In FIG. 3, as pixel in which error has been determined at this moment, e.g., pixel $P_A$ of current frame picture A is shown, and pixel of reference frame picture B located at the same position as this pixel $P_A$ is indicated as $P_B$. In addition, respective lines L constituting slanting line portions of reference frame picture B are the search range (e.g., y=0~15) at this moment.

At time point of this moment, error evaluation values (square values or absolute values) between pixels A (i, j) within picture blocks of current frame picture A and respective pixels B (i+x, j+y) within reference frame B corresponding to respective candidate vectors mv (x, y) ({x=0~15, y=0~15} in this example) are determined. The error evaluation values thus obtained are stored as predictive errors of respective candidate vectors mv (x, y). By repeating such operation up to (i, j)=(0, 0)~(15, 15) in respective pixels A (i, j) in current frame picture A to respectively accumulate them, predictive error values with respect to respective candidate vectors mv (x, y) are obtained. From those candidate vectors, motion vector $MV_{AB}$ from the current frame picture A to reference frame picture B is determined.

When this is described in conformity with the so-called C language, the following expression is given:

```
for(j=0;j<16;j++) {
  for(i=0;i<16;i++) {
    for(x=0;x<16;x++) {
      for(y=0;y<16;y++) {
        E(x,y)+=Error(A(i,j) - B(i+x,j+y));
      }
    }
  }
}
```

Figure 4:
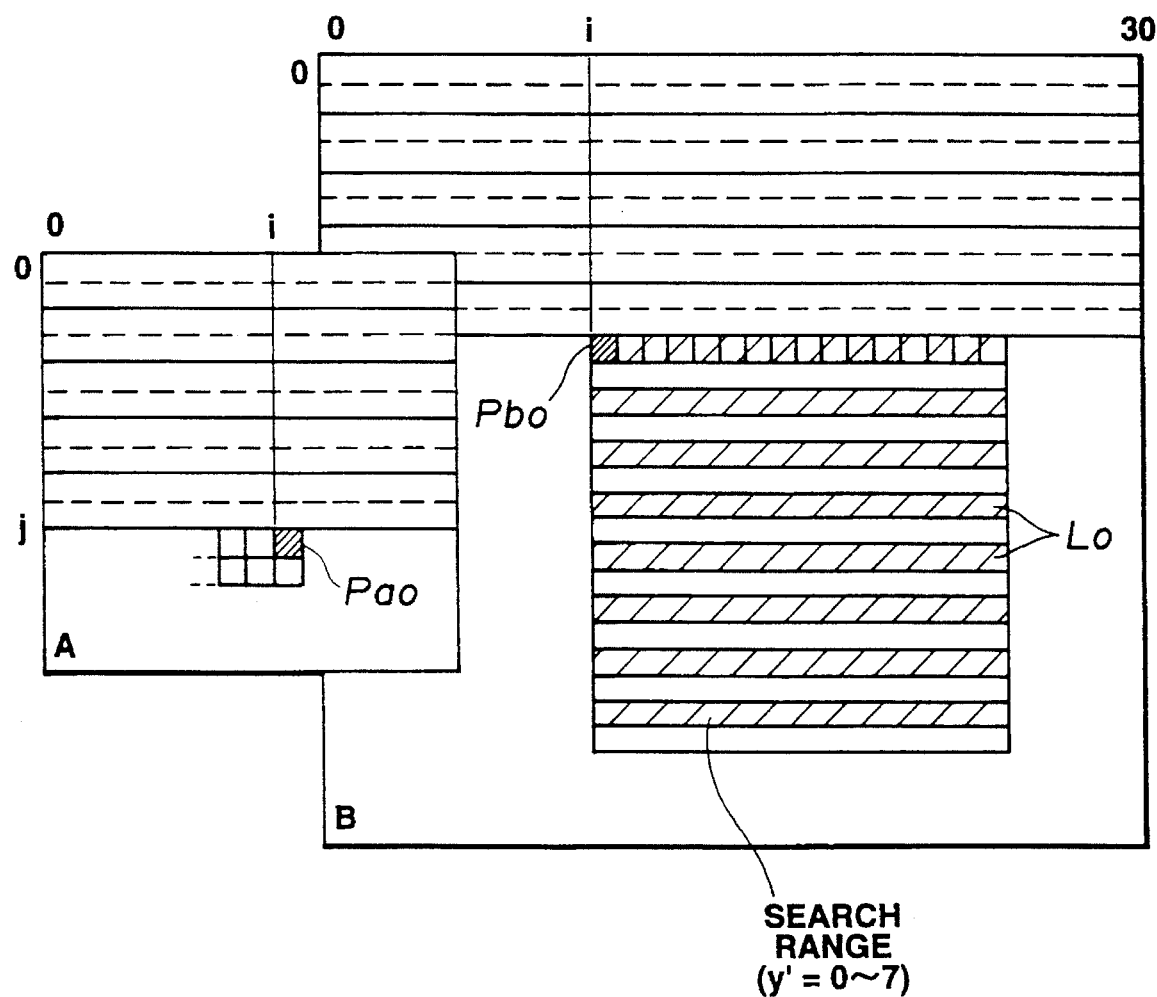
FIG. 4 is a view for explaining accumulation of errors between current odd field and reference odd field.

Similarly to FIG. 3, FIG. 4 shows the case where motion vector $MV_{aobo}$ from current odd field ao to reference odd field bo is searched in the field mode (i.e., mode of motion predictive error calculation in the field). In FIG. 4, pixel Pao of current odd field ao is indicated as pixel in which error has been obtained at the above-mentioned moment of current frame picture A and reference frame picture B, and pixel of reference odd field bo located at the same position as the pixel Pao is indicated as $P_{bo}$. In addition, respective odd lines constituting slanting line portions of reference odd field bo of reference frame picture B are search range (e.g., y'=0~7) of this moment.

Figure 5:
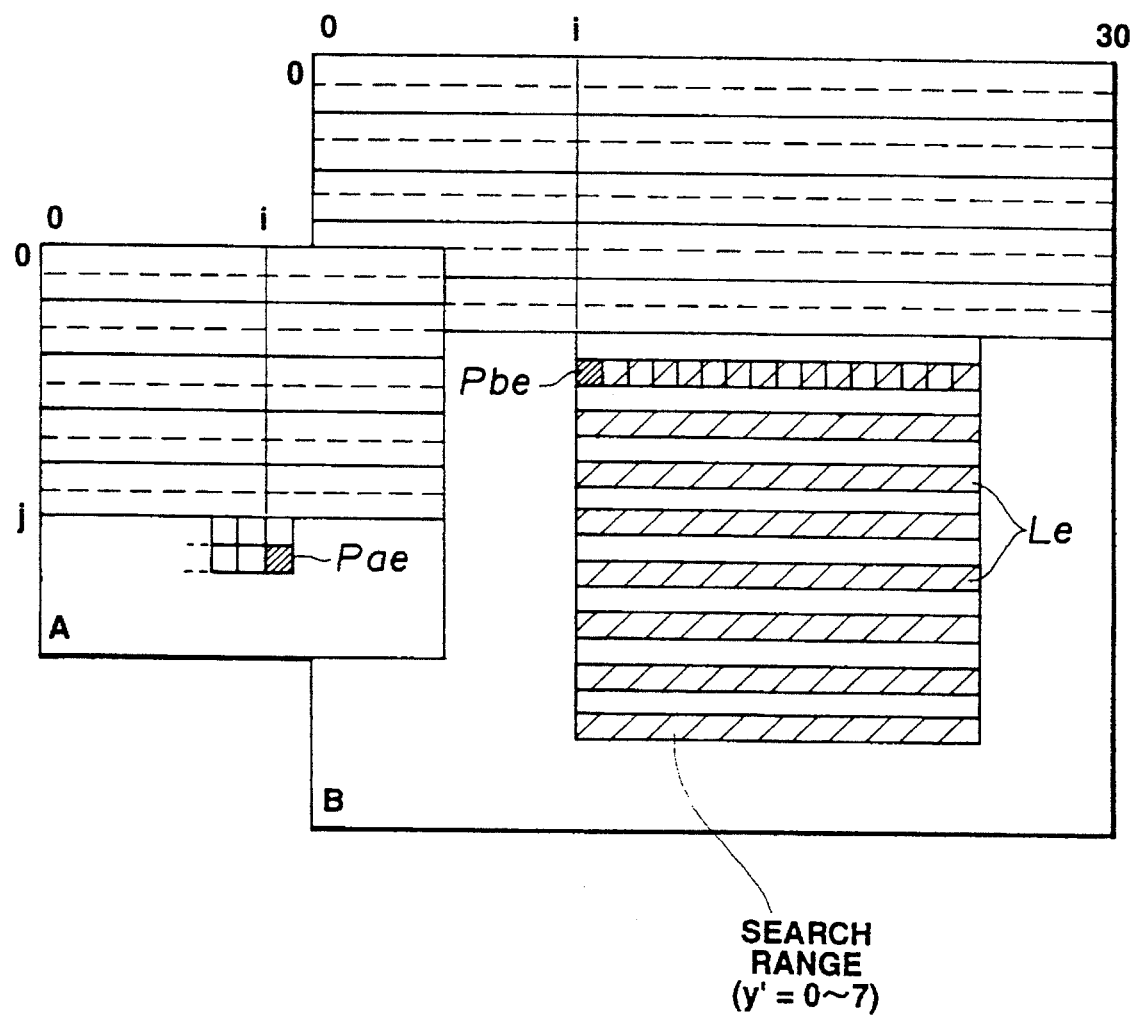
FIG. 5 is a view for explaining accumulation of errors between current even field and reference even field.

Further, similarly to FIG. 3, FIG. 5 shows the case where motion vector $MV_{aebe}$ from current even field ae to reference even field be is searched in the field mode. Also in FIG. 5, pixel $P_{ae}$ of current even field ae is indicated as pixel in which error has been determined at the moment of current frame picture A, and pixel of reference even field be located at the same position as this pixel $P_{ae}$ is indicated as $P_{be}$. In addition, respective even lines Le constituting the slanting line portions of reference even field be of reference frame picture B are the search range (e.g., y'=0~7) at this moment.

Figure 6:
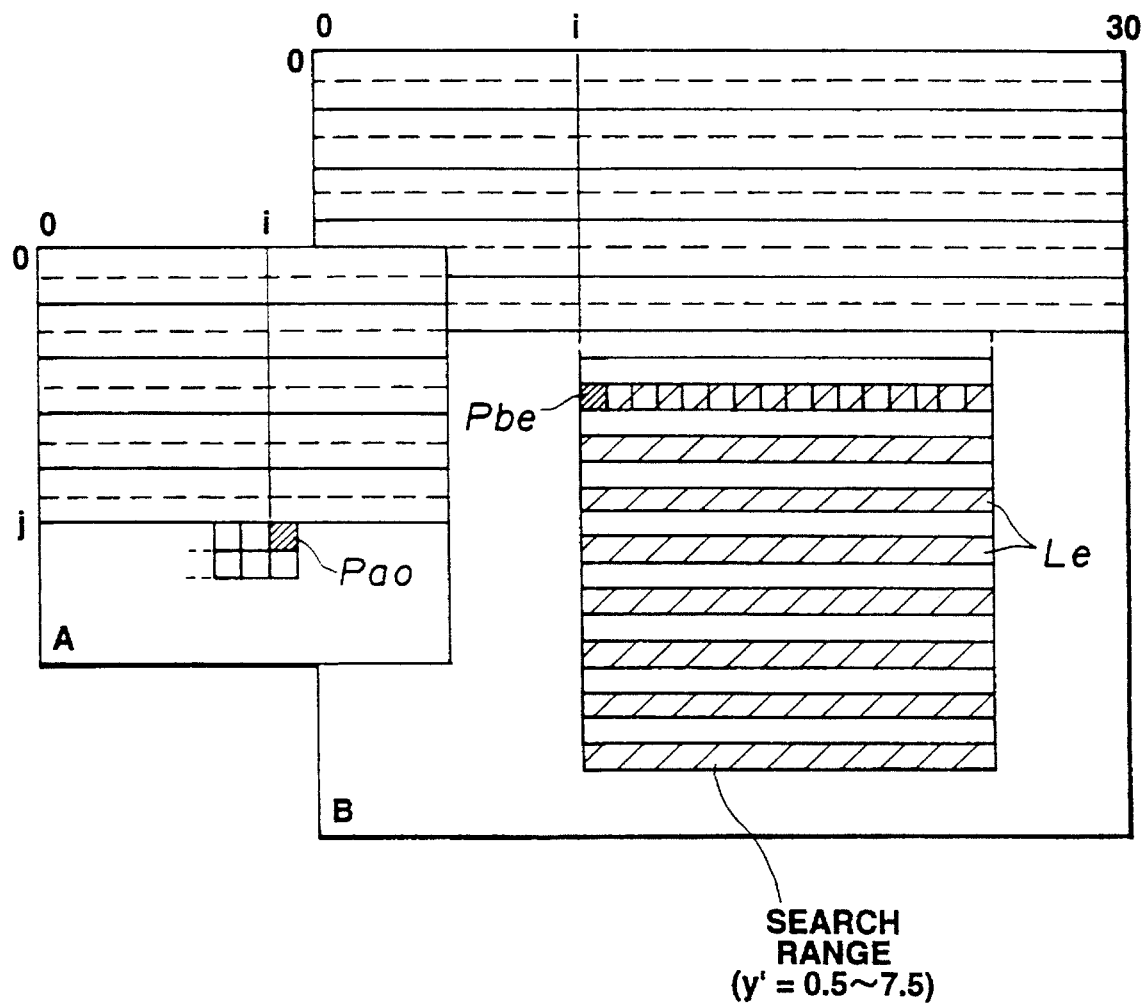
FIG. 6 is a view for explaining accumulation of errors between current odd field and reference even field.

Similarly, the case where motion vector $MV_{aobe}$ from current odd field ao to reference even field be be searched in the field mode is shown in FIG. 6 Also in this FIG. 6, pixel $P_{ao}$ of current odd field ao is indicated as pixel in which error bas been determined at the movement of current frame picture A, and pixel of reference even field be located at the position below by one pixel relative to the pixel $P_{ao}$ is indicated as $P_{be}$. In addition, respective even lines constituting the slanting line portions of reference even field be of reference frame picture B are the search range (e.g., y'=0.5~7.5) at this moment.

Figure 7:
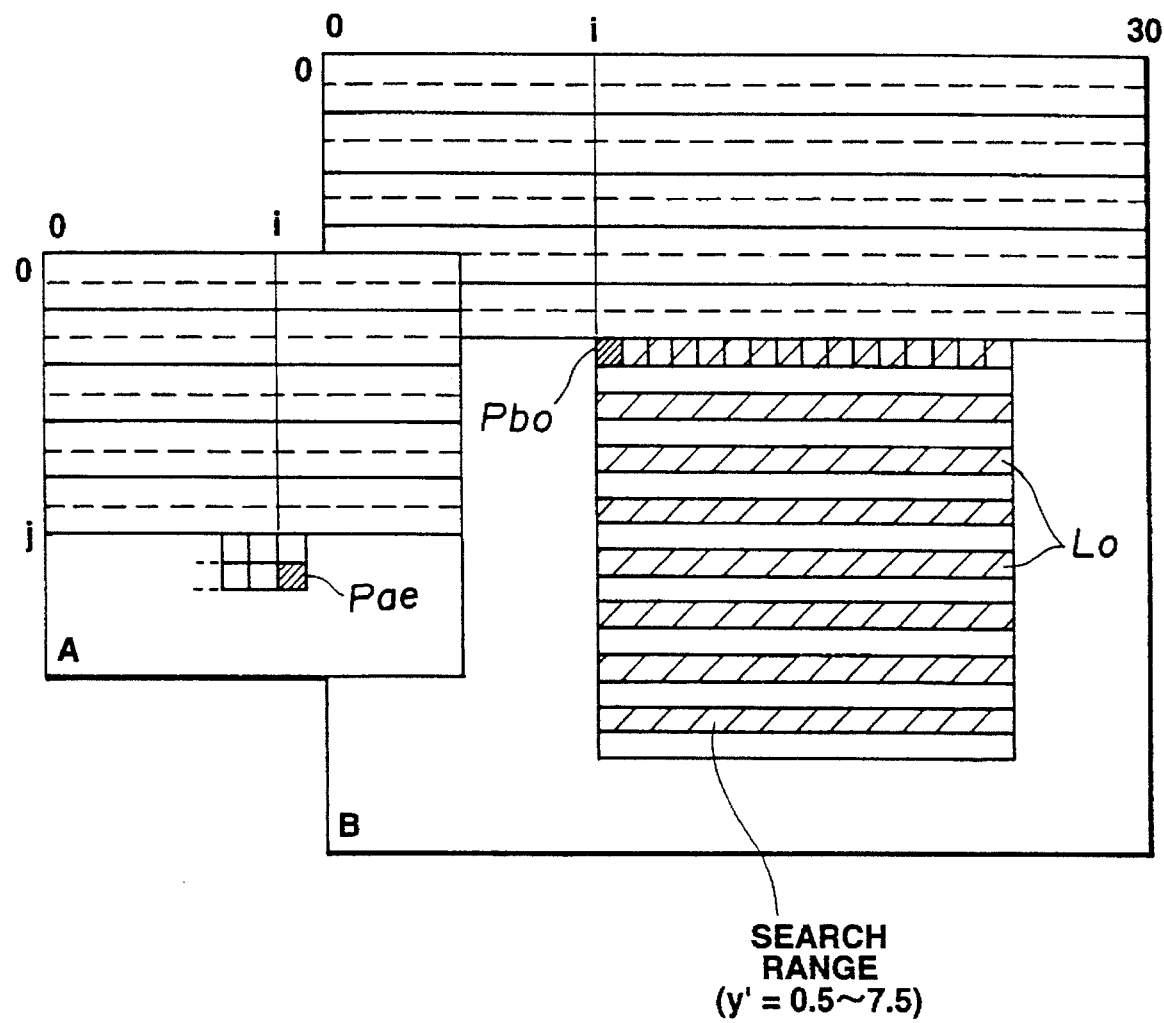
FIG. 7 is a view for explaining accumulation of errors between current even field and reference odd field.

Further, similarly, the case where motion vector $MV_{aebo}$ from current even field ae to reference odd field bo is searched in the field mode is shown in FIG. 7. Also in this FIG. 7, pixel $P_{ae}$ of current even field ae is indicated as pixel in which error has been determined at the moment of current frame picture, and pixel of reference odd field bo located above by one pixel relative to the pixel $P_{ae}$ is indicated as $P_{bo}$. In addition, respective odd lines Lo constituting the slanting line portions of reference odd field bo of reference frame picture B are the search range (e.g., y'=0.5~7.5) at this moment.

However, in the above-described five modes of FIGS. 3~7 (frame mode and field mode), common pixels are used in greater part in both modes as pixel subject to motion predictive error calculation. Further, as previously described, since predictive error value in the frame mode is obtained by adding predictive error values in the field mode, it is seen that search can be supervisorily made as shown in FIG. 8.

Figure 8:
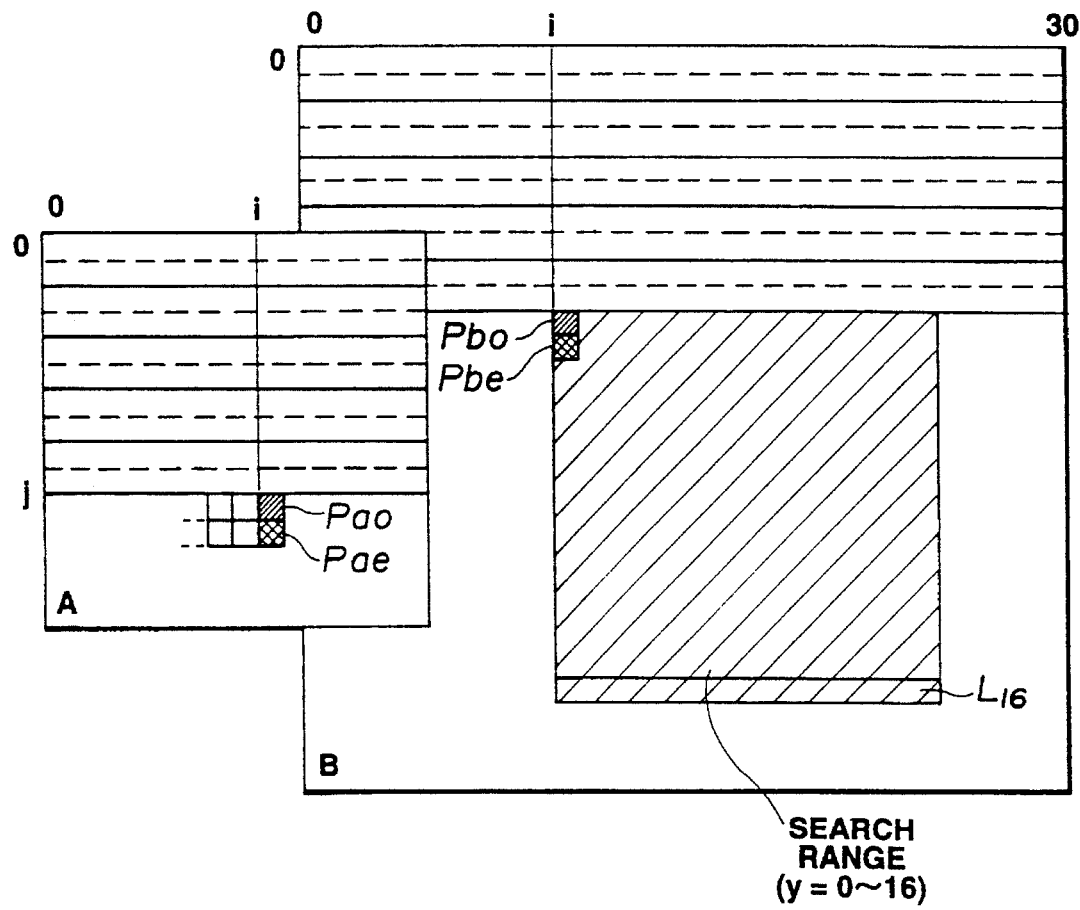
FIG. 8 is a view for explaining accumulation of errors in the apparatus of this embodiment.

Namely, the case where the motion vector $MV_{AB}$ in frame and all of the motion vectors $MV_{aobo}$, $MV_{aebe}$, $MV_{aobe}$, $MV_{aebo}$ in field are searched in the above-mentioned hybrid mode is shown in FIG. 8. In this FIG. 8, the above-mentioned pixels $P_{ao}$ and $P_{ae}$ are indicated as pixel in which error has been determined at the moment of current odd field ao and current even field ae constituting the current frame picture A, and pixels of reference odd field bo and reference even field be located at the same positions as those of these pixels $P_{ao}$ and $P_{ae}$ are indicated as $P_{bo}$ and $P_{be}$. In FIG. 8, the search range at this moment indicated by the slanting lines on the reference frame picture B side increases by one line ($L_{16}$), e.g., y=0~16.

Actual configuration of the embodiment will now be described with reference to FIGS. 1 and 2, and FIG. 9 and figures subsequent thereto.

For convenience of explanation, the configuration and the operation corresponding to the above-described respective formulas and processing of FIGS. 3 to 7 will be first described, and the configuration and the operation corresponding to processing of FIG. 8 according to this invention will be then described with reference to FIGS. 1 and 2.

Figure 9:
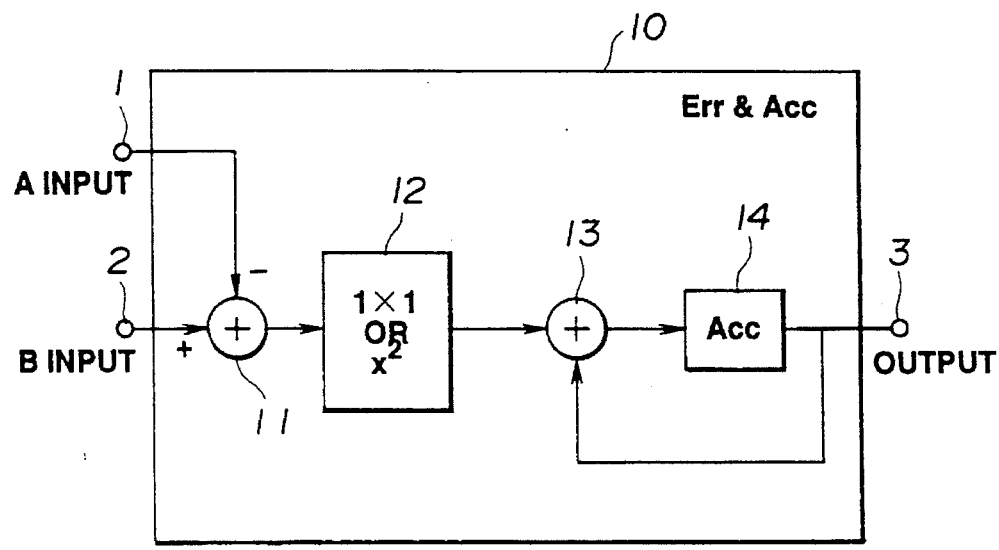
FIG. 9 is a circuit diagram showing, in a block form, an actual configuration of error accumulator of the apparatus of the embodiment.

FIG. 9 shows the configuration of error accumulator 10 for realizing the above-mentioned accumulating function of errors. In the error accumulator 10 of FIG. 9, differences (errors) between data of respective pixels constituting the current frame picture A supplied through input terminal 1 and data of respective pixels constituting the reference frame picture B supplied through input terminal 2 are determined at difference element 11 to calculate absolute values or square values of these difference values at operation element 12 thereafter to accumulate them by accumulator comprised of adder 13 and register 14. This error accumulated value is outputted from output terminal 3 to the configuration of the succeeding stage. In the example of FIG. 9, the above-mentioned difference element 11 is comprised of an adder, from a practical point of view, such that data from input terminal 1 is caused to be subtraction signal and data from input terminal 2 is caused to be addition signal.

Figure 10:
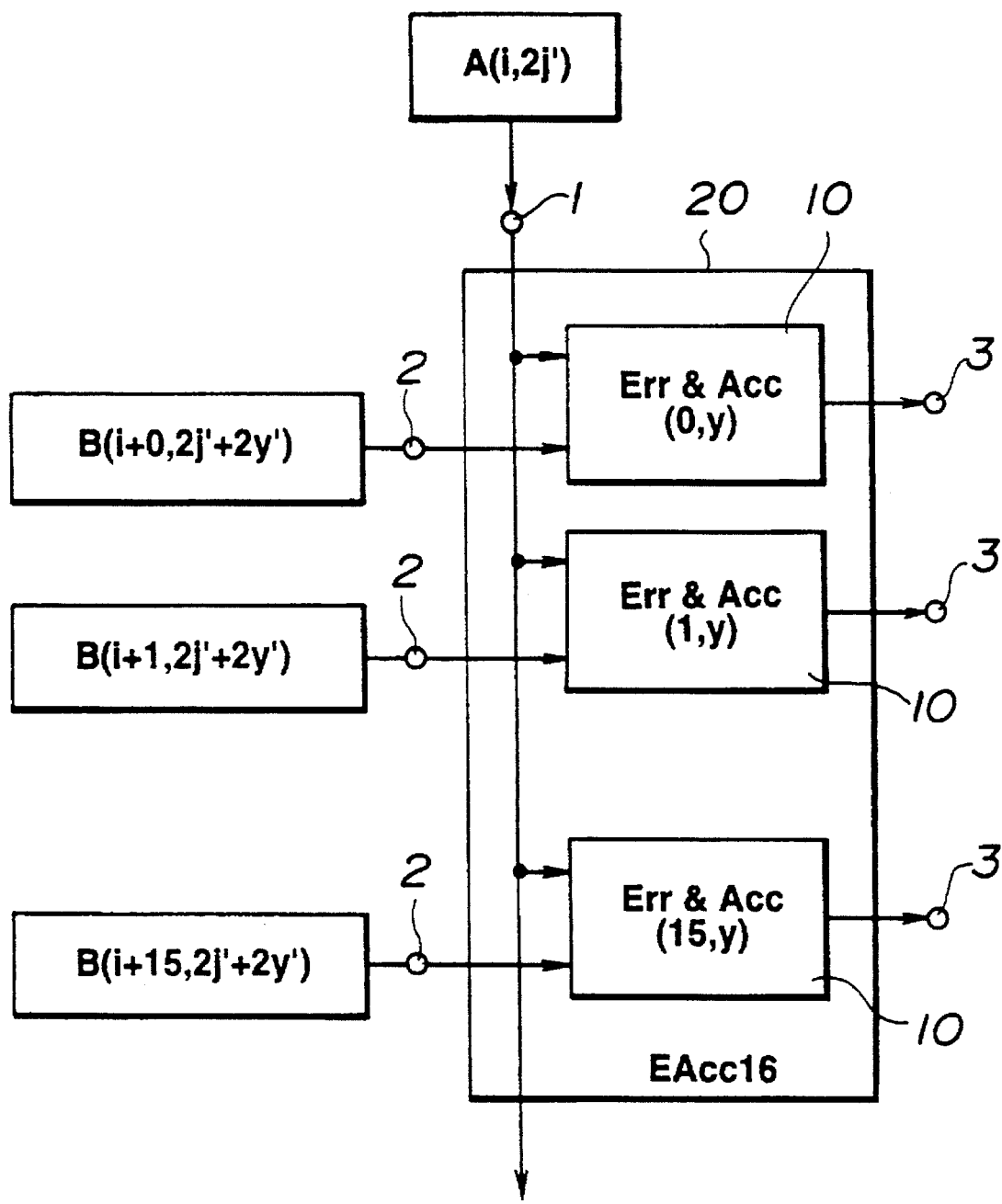
FIG. 10 is a circuit diagram showing, in a block form, an actual configuration of block error accumulating circuit of the apparatus of the embodiment.

FIG. 10 shows the configuration of block error accumulating circuit 20 for determining error accumulated values of respective pixel data every picture blocks between current frame picture A and reference frame picture B.

Block error accumulating circuit 20 of FIG. 10 is comprised of, e.g., sixteen error accumulators 10 of FIG. 9. Input terminal 1 is supplied with data of pixel A(i, 2j') of current frame picture A, and sixteen input terminals 2 are supplied with any data of pixels B(i+0, 2j'+2y')~B(i+15, 2j'+2y') of reference frame picture B. Data of pixel A (i, 2j') through the input terminal 1 is sent commonly to sixteen error accumulators 10. Moreover, data of pixels B (i+0, 2j'+2y')~B (i+15, 2j'+2y') through sixteen input terminals 2 are respectively sent to corresponding error accumulators 10. Namely, to input terminal 2 of the block error accumulating circuit 20, data of successive pixels on the same horizontal line of reference frame picture B are inputted in parallel. Accordingly, at respective sixteen error accumulators 10, error accumulated values of (0, y), (1, y), . . . , (15, y) are respectively determined in parallel, and are then outputted from output terminals 3 corresponding to the respective error accumulators 10.

A system of carrying out accumulation for clock time period corresponding to block size (16×16 in this embodiment) by using respective error accumulators 10 of the search range (corresponding to the number of respective candidate vectors) to determine (calculate) error accumulated values will now be described with reference to FIGS. 11 and 12.

Figure 11:
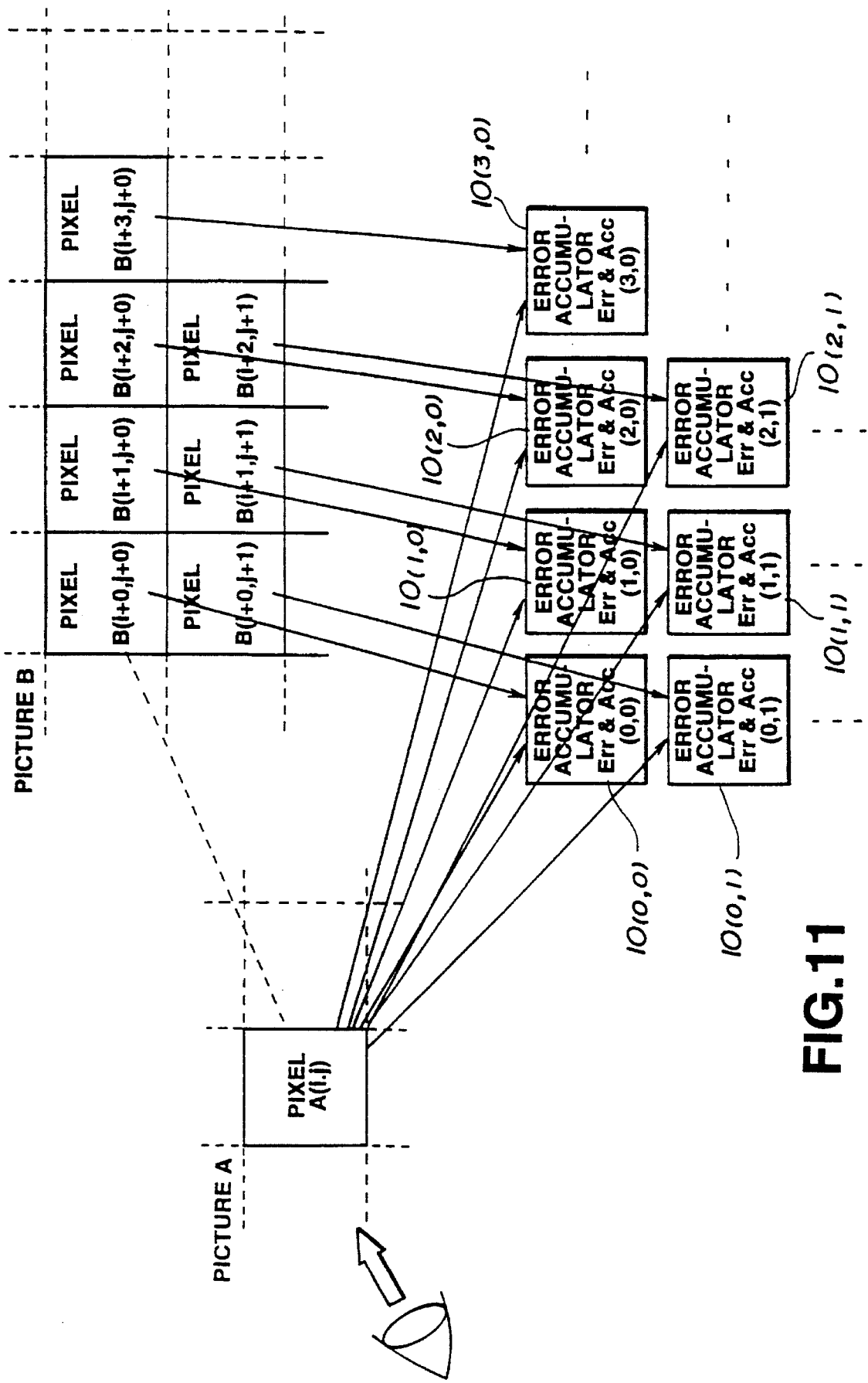
FIG. 11 is a view for explaining the state of error calculation at a certain time.

FIG. 11 illustrates the manner of determining, at a certain time, errors between data of pixel A (i, j) of the current frame picture A and data of respective pixels B (i+x, j+y) (x=0~15, y=0~15) within the search range of reference frame picture B. In FIG. 11, at error accumulator $10_{(0,0)}$, quantity of errors between data of pixel A(i, j) of current frame picture A and data of pixel B(i+0, j+0) of reference frame picture B is being accumulated. Moreover, at error accumulator $10_{(1,0)}$ provided at the right side of the error accumulator $10_{(0,0)}$ in a manner directly adjacent thereto, a quantity of errors between data of pixel A (i, j) of current frame picture A and data of pixel B (i+1, j+0) of reference frame picture B is being accumulated. At error accumulator $10_{(2,0)}$ provided at the right side of the accumulator $10_{(1,0)}$ in a manner directly adjacent thereto, a quantity of errors between data of pixel A (i, j) of current frame picture A and data of pixel B (i+2, j+0) of reference frame picture B is being accumulated. Further, at error accumulator $10_{(0,1)}$ below the error accumulator $10_{(0,0)}$ in a manner directly adjacent thereto, a quantity of errors between data of pixel A (i, j) of current frame picture A and data of pixel B (i+0, j+1) of reference frame picture B is being accumulated. Similarly to the above, at respective error accumulators 10, quantities of errors between data of pixel A (i, j) of current frame picture A and data of respective pixels in the search range of reference frame picture B are being accumulated.

Figure 12:
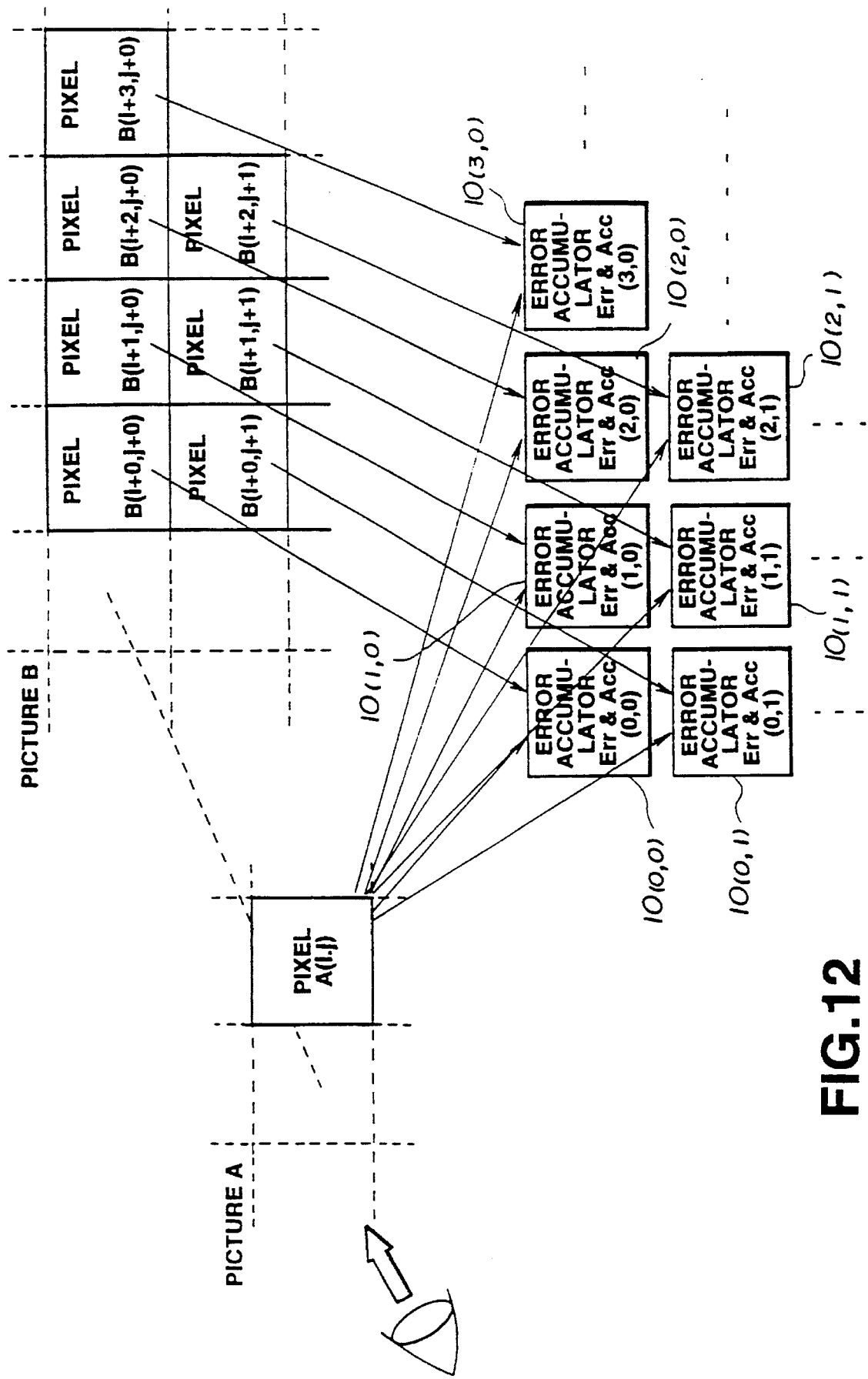
FIG. 12 is a view for explaining the state of error calculation at the subsequent time.

FIG. 12 illustrates the manner of determining errors between data of pixel A (i, j) (i=i+1) of the current frame picture A and respective pixels B (i+x, j+y) (i=i+1) within the search range of reference frame picture B at time (i=i+1) subsequent to the time mentioned with reference to FIG. 11. Also in this FIG. 12, at respective error accumulators 10, quantities of errors between data of pixel A (i, j) of current frame picture A and data of pixels within the search range of reference frame picture B are accumulated. Namely, e.g., error accumulator $10_{(0,0)}$ accumulates error quantities between pixels respectively located adjacently at the right of pixels of current frame picture A and pixels of reference frame pixel B which have been subject to operation (calculation) of error at the time of FIG. 11. It should be noted that, in FIG. 12, since the relationship expressed as i=i+1 holds in the figure and this is similar to FIG. 11, its explanation is omitted.

As has been described with reference to FIGS. 11 and 12 mentioned above, quantities of errors between one pixel data of current frame picture A and a plurality of pixel data of reference frame picture B corresponding to respective candidate vectors are determined (calculated) in parallel at the same time at one unit time. In accumulation of errors between data of respective pixels of current frame picture A and data of respective pixels of reference frame picture B, pixels which are subject to error accumulation on current frame picture A and reference frame picture B are moved.

It should be noted that the configuration of block error accumulating circuit 20 of FIG. 10 mentioned above is realized as indicated by c of FIG. 13 in such a manner that arrangement of error accumulators 10 corresponding to the horizontal line as indicated by a of FIG. 13 is rearranged in vertical direction as indicated by b of FIG. 13 by taking into error accumulation as shown in FIGS. 11 and 12 mentioned above.

FIGS. 14 to 17 show actual configuration of units for carrying out calculations of motion predictive error values between four kinds (odd to odd, even to even, even to odd, odd to even) of fields which have been described with reference to FIGS. 4 to 7 mentioned above. Namely, FIG. 14 corresponds to the FIG. 4 mentioned above, FIG. 15 corresponds to the FIG. 5 mentioned above, FIG. 16 corresponds to the FIG. 6 mentioned above, and FIG. 17 corresponds to the FIG. 7 mentioned above.

Initially, in FIG. 14, respective block error accumulating circuits $20_{o,o}$ determine errors between pixel data of current odd field ao and respective pixel data of reference odd field bo as has been explained with reference to the FIG. 4 or FIGS. 10~13 mentioned above. Outputs of these block error accumulating circuits $20_{o,o}$ are respectively sent to evaluation function calculating circuits 30 for carrying out calculation of the above-mentioned formula (3). At these circuits 30, evaluation function values of the formula (3) are determined. Outputs of these respective evaluation function calculating circuits 30 are sent to minimum error selecting circuit 40. This minimum error selecting circuit 40 selects optimum candidate vector (candidate vector corresponding to evaluation function which provides minimum error) on the basis of the evaluation function values to output it as motion vector $MV_{aobo}$ between current odd field ao and reference odd field bo in the picture block.

Moreover, in FIG. 15, respective block error accumulating circuits $20_{e,e}$ determine errors between pixel data of current-even field ae and respective pixel data of reference even field be as has been explained with reference to FIG. 5 or FIGS. 10~13 mentioned above. Outputs of these respective block evaluation accumulating circuits $20_{e,e}$ are respectively sent to evaluation function calculating circuits 31 for carrying out calculation of the above-mentioned formula (4). At these circuits 31, evaluation function values of the formula (4) are determined. Outputs of these respective evaluation function calculating circuits 31 are sent to minimum error selecting circuit 41. This minimum error selecting circuit 41 selects optimum candidate vector on the basis of the above-mentioned evaluation function values to output it as motion vector $MV_{aebe}$ between current even field ae and reference even field be in the picture block.

Further, in FIG. 16, in a manner explained with reference to FIG. 6 or FIGS. 10~13, respective block error accumulating circuits $20_{o,e}$ determine errors between pixel data of current odd field ao and respective pixel data of reference even field be to respectively carry out calculation of the above-mentioned formula (5) at evaluation function calculating circuits 32 to select optimum candidate vector on the basis of these evaluation function values at minimum error selecting circuit 42 to output it as the motion vector $MV_{aobe}$ between current odd field ao and reference even field be in the picture block.

Similarly, in FIG. 17, respective block error accumulating circuits $20_{e,o}$ determine errors between pixel data of current even field ae and respective pixel data of reference odd field bo in a manner explained with reference to FIG. 7 or FIGS. 10~13. Outputs of these respective block error accumulating circuits $20_{e,o}$ are respectively sent to evaluation function calculating circuits 33 for carrying out calculation of the above-mentioned formula (6). Thus, respective evaluation function values are determined. Minimum error selecting circuit 43 selects optimum candidate vector on the basis of these evaluation function values to output it as the motion vector $MV_{aebo}$ between current even field ae and reference odd field bo in the picture block.

When a circuit for calculating predictive error values between frames is constructed by allowing block error accumulating circuit 20 to be entirely commonly used similarly to these FIGS. 14~17, configuration of the apparatus of the first embodiment shown in FIG. 1 is provided.

Turning back to FIG. 1, as has been explained with reference to FIG. 3 and FIGS. 10 to 13, respective block error accumulating circuits $20_{o,o}$ determine errors between pixel data of current odd field ao of current frame picture A and respective pixel data of reference odd field bo of reference frame picture B. Moreover, block error accumulating circuits $20_{e,e}$ determine errors between pixel data of current even field ae of current frame picture A and respective pixel data of reference even field be of reference frame picture B. Further, block error accumulating circuits $20_{e,o}$ determine errors between pixel data of current even field ae of current frame picture A and respective pixel data of reference odd field bo of reference frame picture B. In addition, block error accumulating circuits $20_{o,e}$ determine errors between pixel data of current odd field ao of current pixel data A and respective pixel data of reference even field be of reference frame picture B.

Outputs of the respective block error accumulating circuits $20_{o,o}$ and $20_{e,e}$ are added at corresponding adders 51, and outputs of respective block error accumulating circuits $20_{e,o}$ and $20_{o,e}$ are added at corresponding adders 52. Thereafter, these added outputs are respectively sent to evaluation function calculating circuits 34. By these circuits 34, evaluation function values are determined. Namely, among these evaluation function calculating circuits 34, calculation indicated by the formula (7) is carried out at circuits $34_{(7)}$, and calculation indicated by the formula (8) is carried out at circuits $34_{(8)}$. Outputs of these respective evaluation function calculating circuits 34 become evaluation function values between current frame picture A and reference frame picture B.

Outputs of these respective evaluation function calculating circuits 34 are sent to minimum error selecting circuit 44. This minimum error selecting circuit selects optimum candidate vector (candidate vector corresponding to evaluation function which provides minimum error) on the basis of the evaluation function values to output it as motion vector $MV_{AB}$ between current frame picture A and reference frame picture B in the picture block.

When the configuration of FIG. 1 and the configurations of FIGS. 14–17 are combined, calculations of five kinds of predictive error values in total of calculations of the previously described four kinds (odd to odd, even to even, even to odd, odd to even) of motion predictive error values between fields, and calculation of motion predictive error value between frames can be realized by unitary configuration. This configuration is the configuration of the apparatus of the second embodiment of this invention shown in FIG. 2.

In FIG. 2, as has been explained with reference to the FIGS. 1 and 3 or 8 mentioned above and FIGS. 10–13 mentioned above, respective block error accumulating circuits $20_{o,o}$ determine errors between pixel data of current odd field ao of current frame picture A and respective pixel data of reference odd field bo of reference frame picture B. Respective block error accumulating circuits $20_{e,e}$ determine errors between pixel data of current even field ae of current frame picture A and respective pixel data of reference even field be of reference frame picture B. Block error accumulating circuits $20_{e,o}$ determine errors between pixel data of current even field ae of current frame picture A and respective pixel data of reference odd field bo of reference frame picture B. In addition, block error accumulating circuits $20_{o,e}$ determine errors between pixel data of current odd field ao of current frame picture A and respective pixel data of reference even field be of reference frame picture B.

Figure 14:
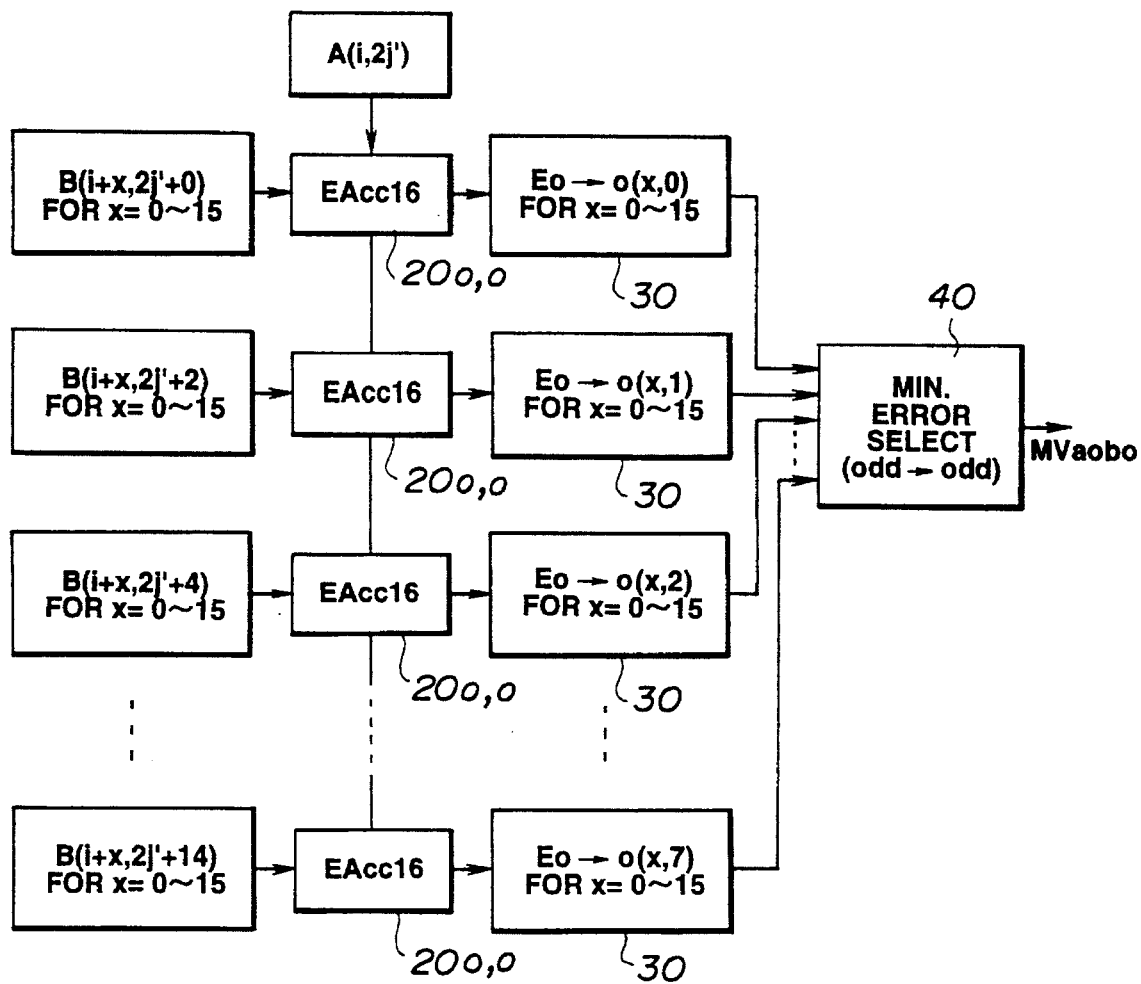
FIG. 14 is a circuit diagram showing, in a block form, configuration for carrying out accumulation of errors between current odd field and reference odd field.
Figure 15:
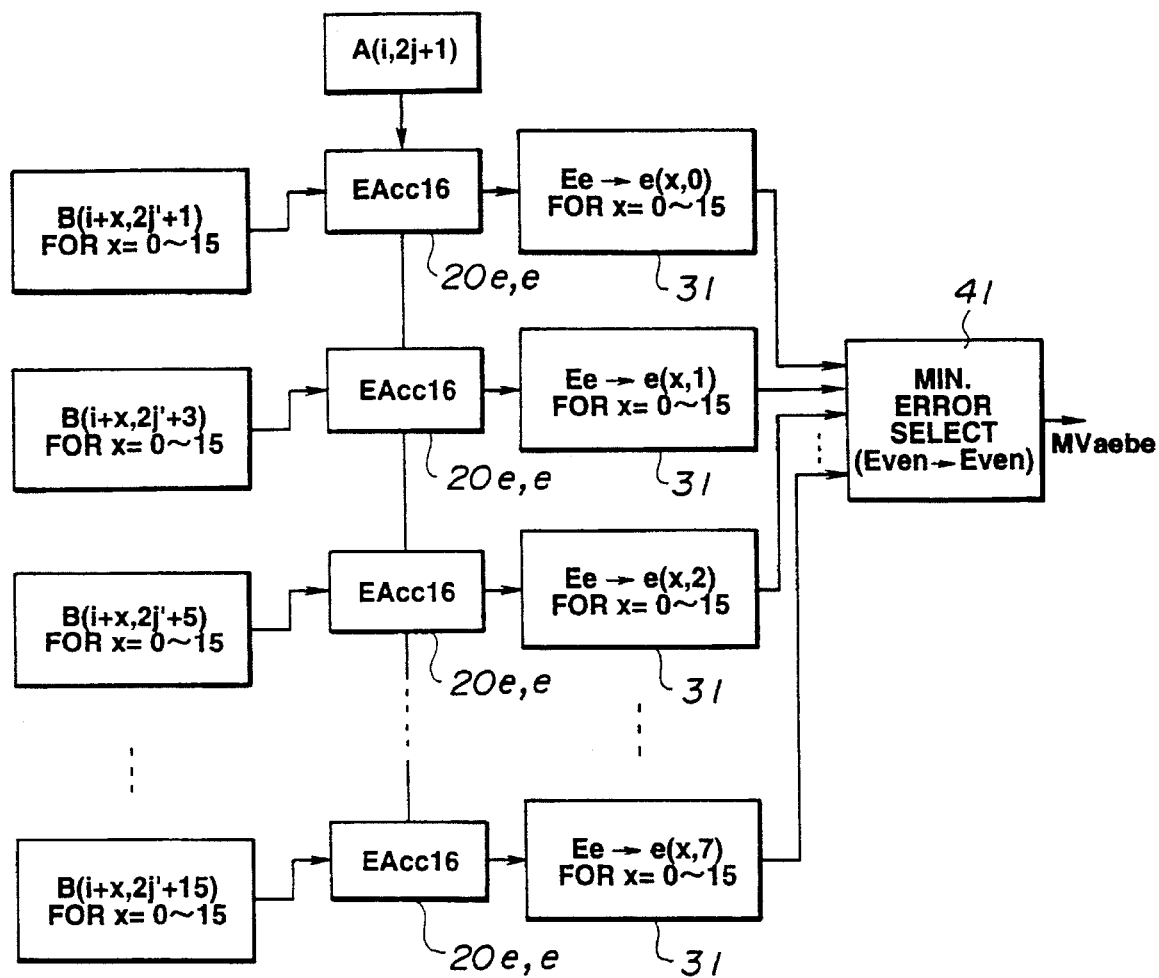
FIG. 15 is a circuit diagram showing, in a block form, configuration for carrying out accumulation of errors between current even field and reference even field.
Figure 16:
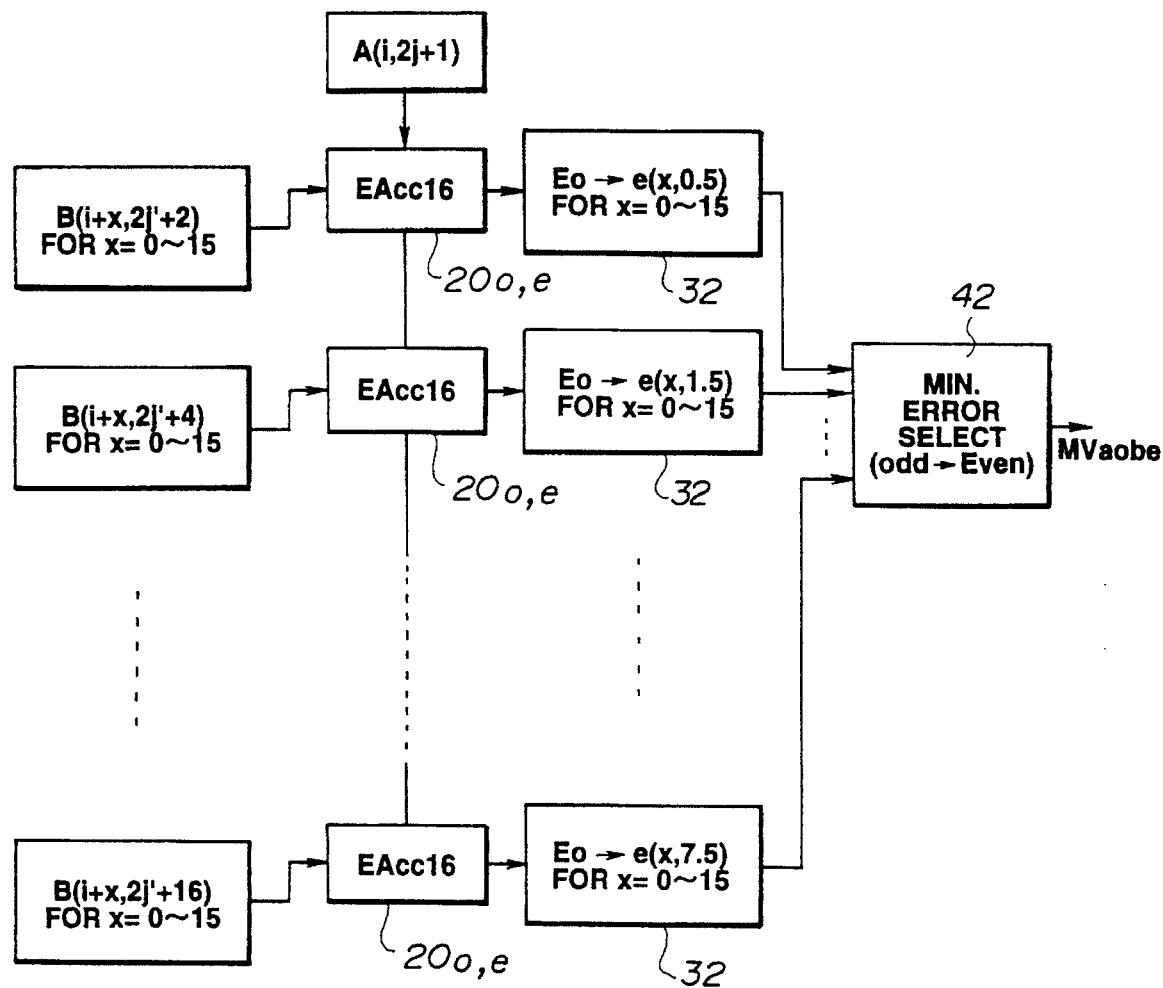
FIG. 16 is a circuit diagram showing, in a block form, configuration for carrying out accumulation of errors between current odd field and reference even field.
Figure 17:
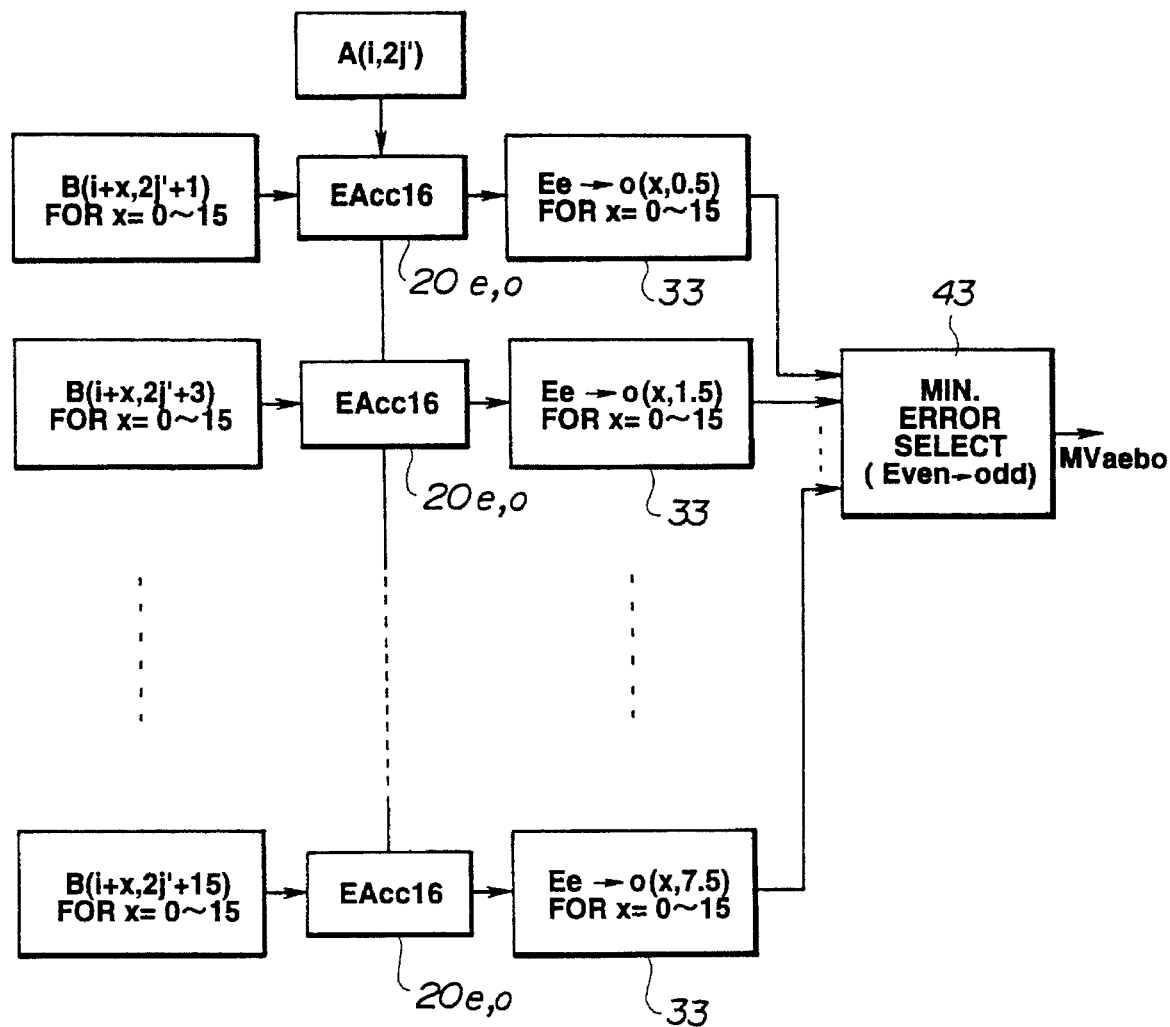
FIG. 17 is a circuit diagram showing, in a block form, configuration for carrying out accumulation of errors between current even field and reference even field.

Outputs of the respective block error accumulating circuits $20_{o,o}$ are sent to evaluation function calculating circuits 30 for carrying out calculation of the formula (3) similar to that in the FIG. 14 mentioned above; outputs of the respective block error accumulating circuits $20_{e,e}$ are sent to evaluation function calculating circuits 31 for carrying out calculation of the formula (4) similar to that in the FIG. 15 mentioned above; outputs of the respective block error accumulating circuits $20_{o,e}$ are sent to evaluation function calculating circuit 32 for carrying out calculation of the formula (5) similar to that in the FIG. 16 mentioned above; and outputs of the respective block error accumulating circuits $20_{e,o}$ are sent to evaluation function calculating circuits 33 for carrying out calculation of the formula (6) similar to that in the FIG. 17 mentioned above. At the same time, outputs of the respective block error accumulating circuits $20_{o,o}$ and $20_{e,e}$ are added at corresponding adders 51, and outputs of the respective block error accumulating circuits $20_{e,o}$ and $20_{o,e}$ are added at corresponding adders 52. Thereafter, these added outputs are respectively sent to evaluation function calculating circuits 34. By these circuits 34, evaluation function values are determined. Namely, these evaluation function calculating circuits 34 also operate similarly to the FIG. 1 mentioned above: calculation indicated by the formula (7) is carried out at circuits $34_{(7)}$ and calculation indicated by the formula (8) is carried out at circuits $34_{(8)}$.

Outputs of the respective evaluation function calculating circuits 34 are sent to minimum error selecting circuit 44 similar to that of the FIG. 1 mentioned above. This minimum error selecting circuit 44 selects optimum candidate vector (candidate vector corresponding to evaluation function which provides minimum error) selected on the basis of evaluation function values to output it as motion vector $MV_{AB}$ between current frame picture A and reference frame picture B in the picture block.

Moreover, outputs of the respective evaluation function calculating circuits 30 are sent to minimum error selecting circuit 40 similar to that of the FIG. 14 mentioned above. Thus, motion vector $MV_{aobo}$ between current odd field ao and reference odd field bo in the picture block is determined by the minimum error selecting circuit 40.

Further, outputs of the respective evaluation function calculating circuits 31 are sent to minimum error selecting circuit 41 similar to that of the FIG. 15 mentioned above. Thus, motion vector $MV_{aebe}$ between current even field ae and reference even field be in the picture block is determined by the minimum error selecting circuit 41.

Similarly, outputs of the respective evaluation function calculating circuits 32 are sent to minimum error selecting circuit 42 similar to that of the FIG. 16 mentioned above. Thus, motion vector $MV_{aobe}$ between current odd field ao and reference even field be in the picture block is determined by the minimum error selecting circuit 42.

Finally, outputs of the respective evaluation function calculating circuits 33 are sent to minimum error selecting circuit 43 similar to that of the FIG. 17 mentioned above. Thus, motion vector $MV_{aebo}$ between current odd field ae and reference even field bo in the picture block is determined by the minimum error selecting circuit 43.

As described above, in accordance with the apparatus of the first or second embodiment of this invention, it is possible to perform calculation of motion predictive error values between frames, or five kinds of calculations of motion predictive error values by using unitary apparatus configuration. Accordingly, the apparatus can become compact and (predictive errors of) motion vectors with respect to two pixels can be calculated at the same time by the unitary apparatus. Thus, the clock rate can be lowered, and higher calculation speed can be provided.

It is to be noted that while detection of motion vectors of P picture has been described in the above-described embodiments, detection of motion vectors of B picture may be made by further adding one apparatus of the first or second embodiment of this invention to allow reference frame picture B to be backward frame picture. In addition, there may be employed an approach in which reference frame picture B is caused to be forward or backward frame picture without supplementing any apparatus, thus to operate twice apparatus of the first or second embodiment of this invention.

INDUSTRIAL APPLICABILITY

As described above, in the motion vector detecting apparatus of this invention, in the case of carrying out five motion predictive error calculations of motion vector from current frame to frame to which reference is made, motion vector from odd field of current frame to odd field of frame to which reference is made, motion vector from odd field of current frame to even field of frame to which reference is made, motion vector from even field of current frame to odd field of frame to which reference is made, and motion vector from even field of current frame to even field of frame to which reference is made, output results of accumulators for carrying out calculation of motion vector for field are used as they are without separately having accumulator for carrying out calculation of motion vector for frame, and calculation of motion vector for frame is carried out at the same time. Thus, the configuration can become compact and higher calculation speed can be provided.

What is claimed is:

1. A motion vector detecting apparatus for detecting a motion vector between a current picture consisting of a first field and a second field and a reference picture consisting of a first field and a second field, the apparatus comprising:

first predictive error detecting means for determining interfield predictive evaluation values of predictive errors with respect to respective plural candidate motion vectors between the first field of the current picture and the first field of the reference picture;

second predictive error detecting means for determining interfield predictive evaluation values of predictive errors with respect to respective plural candidate motion vectors between the second field of the current picture and the second field of the reference picture;

third predictive error detecting means for determining interfield predictive evaluation values of predictive errors with respect to respective plural candidate motion vectors between the first field of the current picture and the second field of the reference picture;

fourth predictive error detecting means for determining interfield predictive evaluation values of predictive errors with respect to respective plural candidate motion vectors between the second field of the current picture and the first field of the reference pictures; and judging means for determining an interframe motion vector between the current picture and the reference picture as a function of said interfield predictive evaluation values determined by the first, second, third and fourth predictive error detecting means.

2. A motion vector detecting apparatus as set forth in claim 1, comprising:

second judging means for judging a motion vector between the first field of the current picture and the first field of the reference picture on the basis of a detected result by the first predictive error detecting means;

third judging means for judging a motion vector between the second field of the current picture and the second field of the reference picture on the basis of a detected result by the second predictive error detecting means;

fourth judging means for judging a motion vector between the first field of the current picture and the second field of the reference picture on the basis of a detected result of the third predictive error detecting means; and fifth judging means for judging a motion vector between the second field of the current picture and the first field of the reference picture on the basis of a detected result of the fourth predictive error detecting means.

3. A motion vector detecting apparatus for detecting a motion vector between a current picture consisting of a first field and a second field and a reference picture consisting of a first field and a second field, the apparatus comprising:

first accumulating means for determining (calculating) accumulated values of evaluation values of differences between respective pixels of the first field of the current picture and respective pixels of the first field of the reference picture every predetermined picture ranges corresponding to respective plural candidate motion vectors between the first field of the current picture and the first field of the reference picture;

second accumulating means for determining accumulated values of evaluation values of differences between respective pixels of the second field of the current picture and respective pixels of the second field of the reference picture every predetermined picture ranges corresponding to respective plural candidate motion vectors between the second field of the current picture and the second field of the reference picture;

third accumulating means for determining accumulated values of evaluation values of differences between respective pixels of the first field of the current picture and respective pixels of the second field of the reference picture every predetermined picture ranges corresponding to respective plural candidate motion vectors between the first field of the current picture and the second field of the reference picture;

fourth accumulating means for determining accumulated values of evaluation values of differences between respective pixels of the second field of the current picture and respective pixels of the first field of the reference picture every predetermined picture ranges corresponding to respective plural candidate motion vectors between the second field of the current picture and the first field of the reference picture;

first adding means for adding accumulated results of the first and second accumulating means;

second adding means for adding accumulated results of the third and fourth accumulating means; and selector means for selecting an added result which is judged to be minimum from added results of the first and second adding means to take out, as a motion vector between frames, a candidate motion vector corresponding to the selected added result from plural candidate motion vectors between frames.

4. A motion vector detecting apparatus as set forth in claim 3, comprising:

second selector means for selecting an accumulated result which is judged to be minimum from accumulated results of the first accumulating means to take out, as a motion vector between the first field of the current picture and the first field of the reference picture, a candidate vector corresponding to the selected accumulated result from plural candidate motion vectors between the first field of the current picture and the first field of the reference picture;

third selector means for selecting an accumulated result which is judged to be minimum from accumulated results of the second accumulating means to take out, as a motion vector between the second field of the current picture and the second field of the reference picture, a candidate vector corresponding to the selected accumulated result from plural candidate motion vectors between the second field of the current picture and the second field of the reference picture;

fourth selector means for selecting an accumulated result which is judged to be minimum from accumulated results of the third accumulating means to take out, as a motion vector between the first field of the current picture and the second field of the reference picture, a candidate vector corresponding to the selected accumulated result from plural candidate motion vectors between the first field of the current picture and the second field of the reference picture; and fifth selector means for selecting an accumulated result which is judged to be minimum from accumulated results of the fourth accumulating means to take out, as a motion vector between the second field of the current picture and the first field of the reference picture, a candidate vector corresponding to the selected accumulated result from plural candidate motion vectors between the second field of the current picture and the first field of the reference picture.

5. A motion vector detecting method of detecting a motion vector between a current picture consisting of a first field and a second field and a reference picture consisting of a first field and a second field, the method comprising the steps of:

determining interfield predictive evaluation values of first predictive errors with respect to respective plural candidate motion vectors between the first field of the current picture and the first field of the reference picture;

determining interfield predictive evaluation values of second predictive errors with respect to respective plural candidate motion vectors between the second field of the current picture and the second field of the reference picture;

determining interfield predictive evaluation values of third predictive errors with respect to respective plural candidate motion vectors between the first field of the current picture and the second field of the reference picture;

determining interfield predictive evaluation values of fourth predictive errors with respect to respective plural candidate motion vectors between the second field of the current picture and the first field of the reference picture; and determining an interframe motion vector between the current picture and the reference picture as a function of said interfield predictive evaluation values of the first, second, third and fourth predictive errors.

6. A motion vector detecting method as set forth in claim 5, the method comprising the steps of:

determining a motion vector between the first field of the current picture and the first field of the reference picture on the basis of evaluation values of the first predictive errors;

determining a motion vector between the second field of the current picture and the second field of the reference picture on the basis of evaluation values of the second predictive errors;

determining a motion vector between the first field of the current picture and the second field of the reference picture on the basis of evaluation values of the third predictive errors; and determining a motion vector between the second field of the current picture and the first field of the reference picture on the basis of evaluation values of the fourth predictive errors.

7. A motion vector detecting method of detecting a motion vector between a current picture consisting of a first field and a second field and a reference picture consisting of a first field and a second field, the method comprising the steps of:

determining first accumulated values of evaluation values of differences between respective pixels of the first field of the current picture and respective pixels of the first field of the reference picture every predetermined picture ranges corresponding to respective plural candidate motion vectors between the first field of the current picture and the first field of the reference picture;

determining second accumulated values of evaluation values of differences between respective pixels of the second field of the current picture and respective pixels of the second field of the reference picture every predetermined picture ranges corresponding to respective plural candidate motion vectors between the second field of the current picture and the second field of the reference picture;

determining third accumulated values of evaluation values of differences between respective pixels of the first field of the current picture and respective pixels of the second field of the reference picture every predetermined picture ranges corresponding to respective plural candidate motion vectors between the first field of the current picture and the second field of the reference picture;

determining fourth accumulated values of evaluation values of differences between respective pixels of the second field of the current picture and respective pixels of the first field of the reference picture every predetermined picture ranges corresponding to respective plural candidate motion vectors between the second field of the current picture and the first field of the reference picture;

adding the first and second accumulated values to generate a first added result;

adding the third and fourth accumulated values to generate a second added result; and selecting an added result which is to judged be minimum from the first and second added results to take out, as a motion vector between frames, a candidate motion vector corresponding to the selected added result from plural motion vectors between frames.

8. A motion vector detecting method as set forth in claim 7, the method comprising the steps of:

selecting an accumulated value which is judged to be minimum from the first accumulated values to take out, as a motion vector between the first field of the current picture and the first field of the reference picture, a candidate vector corresponding to the selected accumulated value from plural candidate motion vectors between the first field of the current picture and the first field of the reference picture;

selecting an accumulated value which is judged to be minimum from the second accumulated values to take out, as a motion vector between the second field of the current picture and the second field of the reference picture, a candidate vector corresponding to the selected accumulated value from plural candidate motion vectors between the second field of the current picture and the second field of the reference picture;

selecting an accumulated value which is judged to be minimum from the third accumulated values to take out, as a motion vector between the first field of the current picture and the second field of the reference picture, a candidate vector corresponding to the selected accumulated value from plural candidate motion vectors between the first field of the current picture and the second field of the reference picture; and selecting an accumulated value which is judged to be minimum from the fourth accumulated values to take out, as a motion vector between the second field of the current picture and the first field of the reference picture, a candidate vector corresponding to the selected accumulated value from plural candidate motion vectors between the second field of the current picture and the first field of the reference picture.

* * * * *